(12) United States Patent  
Takao

(10) Patent No.: US 8,707,102 B2
(45) Date of Patent: Apr. 22, 2014

(54) METHOD AND PROGRAM FOR VERIFYING OPERATION OF PROCESSOR

(75) Inventor: Hiroshi Takao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 204 days.

(21) Appl. No.: 13/225,839

(22) Filed: Sep. 6, 2011

(65) Prior Publication Data

US 2012/0117426 A1    May 10, 2012

(30) Foreign Application Priority Data

Nov. 5, 2010    (JP) .................................. 2010-248120

(51) Int. Cl.
 *G06F 11/00*    (2006.01)

(52) U.S. Cl.
 USPC .................... 714/33; 714/25; 714/28; 714/32

(58) Field of Classification Search
 USPC ......................................... 714/25, 28, 32, 33
 See application file for complete search history.

(56) References Cited

U.S. PATENT DOCUMENTS

| 5,568,407 | A  | * | 10/1996 | Hass et al. ..................... 702/118 |
| 6,567,934 | B1 | * | 5/2003  | Yen et al. ......................... 714/33 |
| 7,320,114 | B1 | * | 1/2008  | Jain et al. ....................... 716/106 |
| 7,533,294 | B2 | * | 5/2009  | Mishra et al. .................... 714/10 |
| 2005/0223281 | A1 | * | 10/2005 | Maly et al. ....................... 714/20 |
| 2007/0061644 | A1 | * | 3/2007  | Birmiwal et al. ............. 714/726 |
| 2009/0172630 | A1 | * | 7/2009  | Wang et al. ..................... 716/18 |

FOREIGN PATENT DOCUMENTS

| JP | 4-247534    | A | 9/1992 |
| JP | 8-166892    | A | 6/1996 |
| JP | 10-011311   |   | 1/1998 |
| JP | 11-338727   | A | 12/1999 |
| JP | 2000-011022 |   | 1/2000 |
| JP | 2002-323992 | A | 11/2002 |

OTHER PUBLICATIONS

Japanese Office Action mailed Feb. 4, 2014 for corresponding Japanese Application No. 2010-248120, with partial English-language translation.

* cited by examiner

*Primary Examiner* — Charles Ehne
(74) *Attorney, Agent, or Firm* — Fujitsu Patent Center

(57) ABSTRACT

A method for verifying an operation of a processor, the method includes executing, by a software simulator, a test instruction used for verifying a model dependent operation of the processor, obtaining an expectation value from a result of the executed test instruction, obtaining a result value of the test instruction executed by the processor, and comparing, by a verification processor, the obtained expectation value with the obtained result value to determine a match or mismatch between the expectation value and the result value.

19 Claims, 20 Drawing Sheets

METHOD AND PROGRAM FOR VERIFYING OPERATION OF PROCESSOR

CROSS-REFERENCE TO RELATED APPLICATION

This application is based upon and claims the benefit of priority of the prior Japanese Patent Application No. 2010-248120 filed on Nov. 5, 2010, the entire contents of which are incorporated herein by reference.

FIELD

The embodiments discussed herein are related to a method and an apparatus for verifying an operation of a processor.

BACKGROUND

A random testing method for testing processors by randomly generating test instruction sequences and test data on the basis of random numbers has been known as a processor-operation verification method. There is also a method for testing processor operations by comparing a result value obtained by causing a processor to execute random testing with an expectation value obtained by causing a simulator to simulate the operation of the processor. The simulator is, for example, a simulation program realized by software. The simulator performs simulation testing for logic specifications of the processor.

Examples of related art include Japanese Laid-open Patent Publication No. 04-247534, Japanese Laid-open Patent Publication No. 08-166892, and Japanese Laid-open Patent Publication No. 11-338727.

Operations defined based on the logic specifications of the processor are incorporated into the processor. Thus, it has been though that, even for processors of various models whose model numbers and revision numbers are different, simulation may be able to be executed using the same simulator if the logic specifications are the same. However, actual simulation revealed that there are cases in which not only a logic failure or a processor device failure but also a model-dependent operation in the logic specifications causes a mismatch between the result value and the expectation value. That is, when predetermined test instruction sequences are executed, model-dependent operations that may not be anticipated by an examiner may occur and it has become clear that there is a possibility in that processors of different models even with the same logic specifications perform execution operations of different test instruction sequences.

However, the examiner may not know whether or not the processor to be tested has a model-dependent operation in the logic specifications. Thus, when an actual simulation indicates a mismatch between the result value and the expectation value, it is desirable to analyze whether or not it is caused by a model-dependent operation. Thus, based on a result of the analysis, the simulator is revised or the test conditions are changed to execute simulation again.

Such analysis of the cause of the mismatch between the result value and the expectation value, revision of the simulator, and so on involve complex processes, which lead to increases in the time and man-hours for the testing. Accordingly, the processor operation may not be efficiently verified. In addition, even when re-simulation is further performed through revision of the simulator or the like, there are cases in which a failure or defect originating in the processor may not be detected. That is, the accuracy of the operation verification declines.

SUMMARY

According to an aspect of an embodiment, a method for verifying an operation of a processor, the method includes executing, by a software simulator, a test instruction used for verifying a model dependent operation of the processor, obtaining an expectation value from a result of the executed test instruction, obtaining a result value of the test instruction executed by the processor, and comparing, by a verification processor, the obtained expectation value with the obtained result value to determine a match or mismatch between the expectation value and the result value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A first embodiment will be described below with reference to FIGS. 1 to 8.

Figure 1:
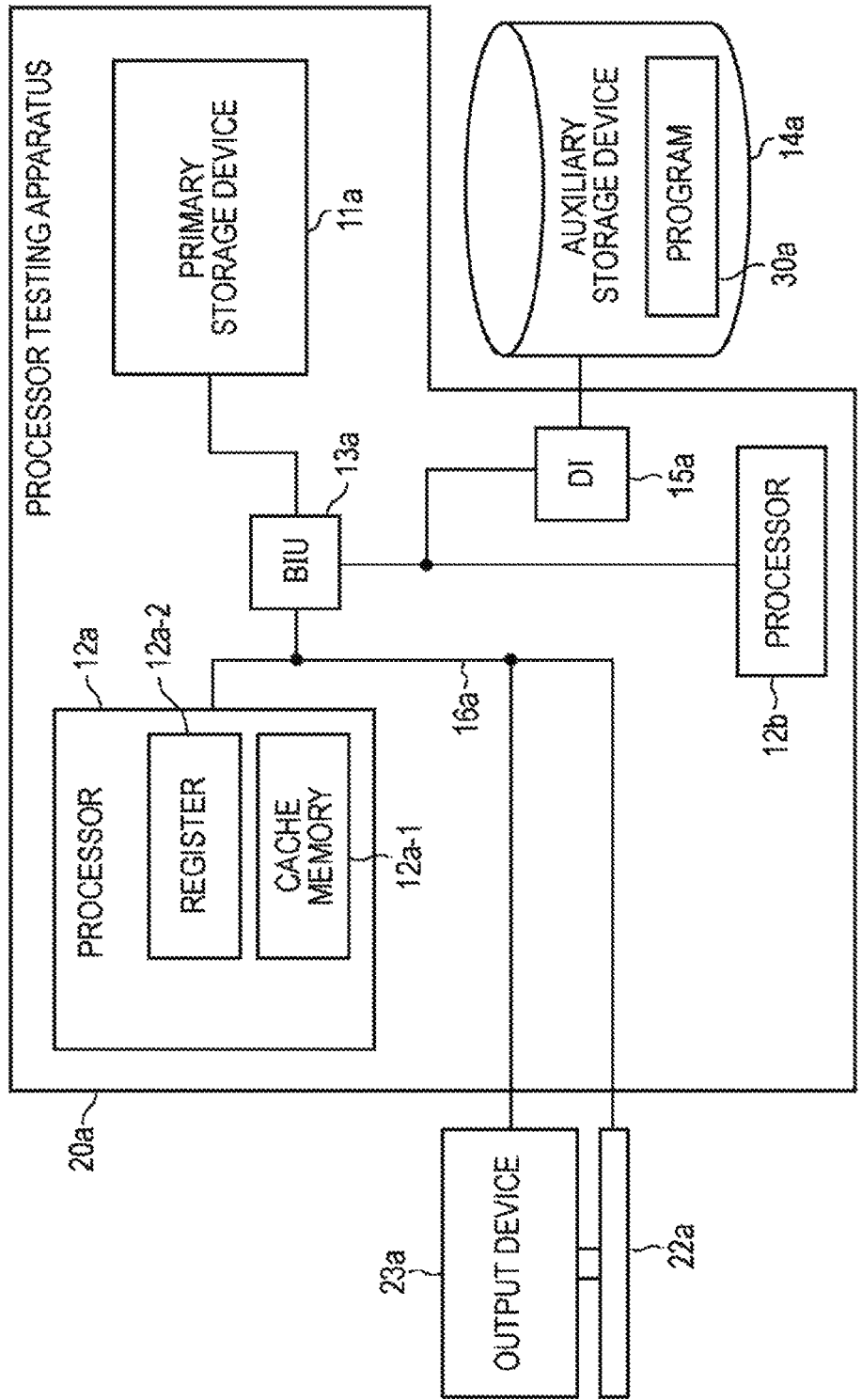
FIG. 1 is a block diagram of a hardware configuration of a processor testing apparatus according to a first embodiment.

FIG. 1 is a block diagram of a hardware configuration of a processor testing apparatus 20a according to a first embodiment. The processor testing apparatus 20a includes a primary storage device 11a, processors 12a and 12b, a bus interface unit (BIU) 13a, and a disk interface (DI) 15a.

In the example illustrated in FIG. 1, the processor 12b is a device to be tested. Thus, the processor testing apparatus 20a functions as an apparatus for testing the processor 12b. An auxiliary storage device 14a is connected to the processor testing apparatus 20a via the disk interface (DI) 15a.

The primary storage device 11a includes a main memory, a cache memory, and a flash memory and stores instructions and data. Examples of the main memory include a SIMM (Single Inline Memory Module) and a DIMM (Dual Inline Memory Module). One example of the flash memory is an EPROM (Erasable Programmable Read Only Memory).

The processor 12a is a device for executing computational-operation processing, such as four arithmetic operations and logic operations. The processor 12a has a function for executing a compiler program to transform a program written in a programming language into instructions coded in a machine language directly executable by the processor 12a. The processor 12a reads the instructions, coded in the machine language, from the primary storage device 11a. During execution of the program, the processor 12a converts the program into the instructions coded in the machine language and stores the instruction in a register 12a-2 in the processor 12a. By executing the instructions stored in the register 12a-2, the processor 12a may execute the aforementioned computational-operation processing to perform various types of calculation and control.

The processor 12a has a cache memory 12a-1, in addition to the register 12a-2. The cache memory 12a-1 is a high-speed, small-capacity memory that is used to hold part of data stored in the primary storage device 11a, in order to compensate for a speed difference between the speed of computational operation of the processor 12a and the speed of data reading from the primary storage device 11a. The cache memory 12a-1 may also be another device disposed external to the processor 12a. The register 12a-2 is a storage device that is used to temporarily hold a result of calculation of the processor 12a and to hold addresses for reading/writing of the primary storage device 11a. The register 12a-2 is also used to hold an operating state of the processor 12a, an input device 22a, or an output device 23a. The register 12a-2 operates at a quite high speed since it may be implemented with a storage element, but has a small capacity compared to the cache memory 12a-1.

For testing the processor 12a, the processor testing apparatus 20a causes the processor 12a to execute a program 30a stored in the auxiliary storage device 14a. Through execution of the program 30a, the processor 12a creates a test instruction sequence, described below. Next, the processor 12a executes the created test instruction sequence to perform testing according to an advanced control system of the processor 12a.

The bus interface unit (BIU) 13a is a chipset connected to the primary storage device 11a, the processors 12a and 12b, and the disk interface (DI) 15a. The bus interface unit 13a includes a control circuit that functions according to a standard, such as an AGP (Accelerated Graphics Port) standard or PCI (Peripheral Component Interconnect) Express standard. The bus interface unit 13a may further include circuits for a PCI bus, an IDE (Integrated Drive Electronics) port, a keyboard port, a mouse port, and a USB (Universal Serial Bus). The bus interface unit 13a is connected to the input device 22a and the output device 23a, provided external to the processor testing apparatus 20a, through a bus 16a. The bus interface unit 13a may be implemented as two or more discrete chipsets, for example, one for high-speed communication and one for low-speed communication, so as to correspond to communication speeds of the equipment connected to the bus 16a.

The input device 22a may be a keyboard or mouse for inputting information to the processor testing apparatus 20a. The output device 23a may be a display or printer to which a processing state or processing result is to be output from the processor testing apparatus 20a.

The auxiliary storage device 14a is a magnetic disk drive, an optical disk drive, or an SSD (Solid State Drive) utilizing a nonvolatile memory, such as a flash memory. The auxiliary storage device 14a reads data from or writes data to a storage medium, such as a magnetic disk or optical disk. In this case, the processor 12a reads the program 30a from the auxiliary storage device 14a in which it is recorded and stores the read program 30a in the aforementioned magnetic disk drive, the SSD, or the like. The program 30a is described below with reference to FIG. 2.

The disk interface (DI) 15a is a connection circuit for providing connection between the processor 12a and the auxiliary storage device 14a. The disk interface 15a is designed according to, for example, a Serial ATA (Advanced Technology Attachment) standard, SCSI (Small Computer System Interface) standard, and FC (Fibre Channel) standard.

Figure 2:
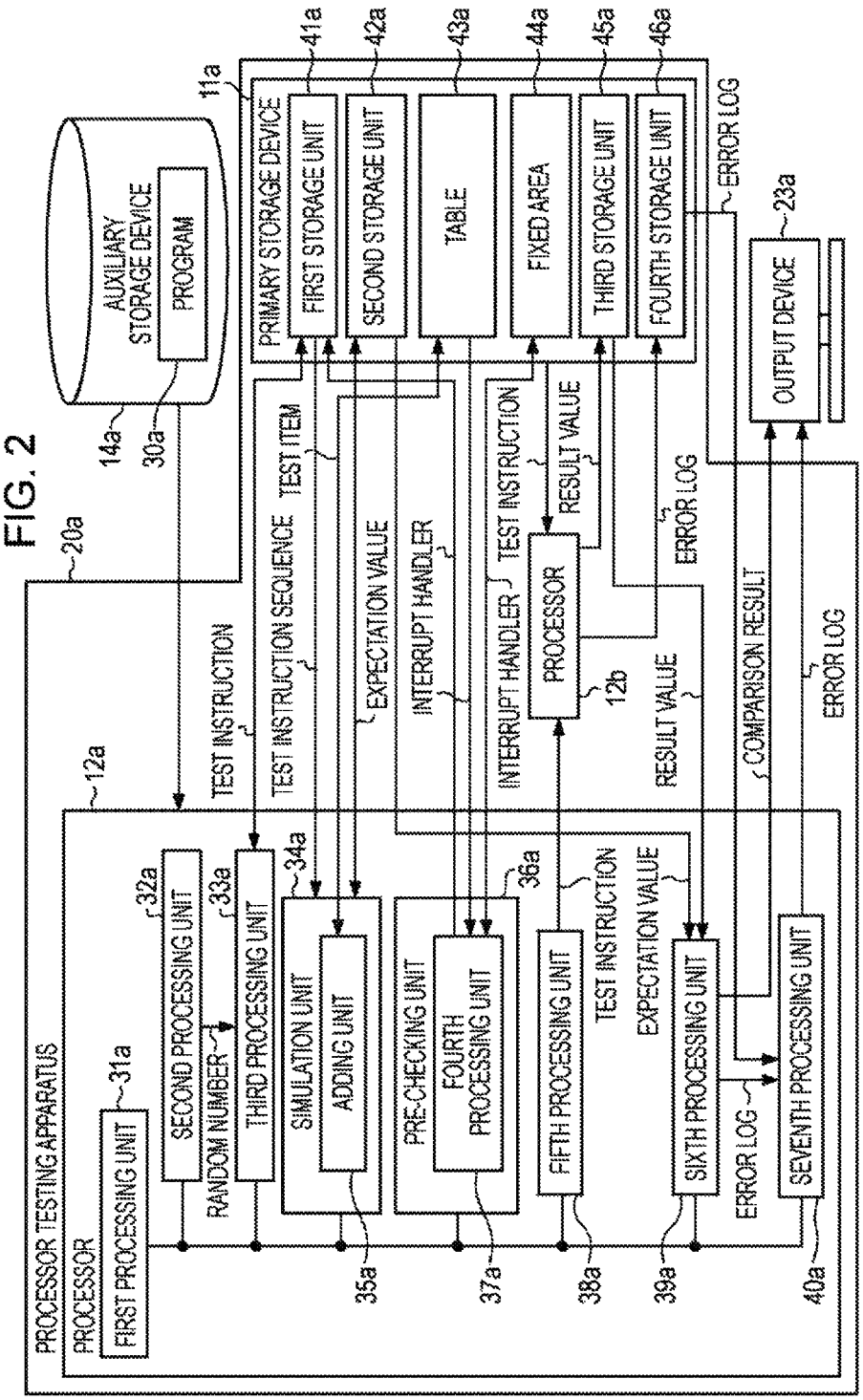
FIG. 2 is a block diagram of a functional configuration of the processor testing apparatus according to the first embodiment.

FIG. 2 is a block diagram of a functional configuration of the processor testing apparatus 20a according to the first embodiment. In the processor testing apparatus 20a illustrated in FIG. 2, elements that are substantially the same as those illustrated in FIG. 1 are denoted by the same reference characters, and descriptions thereof are not given hereinafter.

In accordance with the program 30a, the processor 12a operates as a first processing unit 31a, a second processing unit 32a, a third processing unit 33a, a simulation unit 34a, an adding unit 35a, a pre-checking unit 36a, a fourth processing unit 37a, a fifth processing unit 38a, a sixth processing unit 39a, and a seventh processing unit 40a.

The primary storage device 11a operates as a first storage unit 41a, a second storage unit 42a, a table 43a, a fixed area 44a, a third storage unit 45a, and a fourth storage unit 46a.

The first storage unit 41a stores a test instruction sequence generated by the third processing unit 33a. The second storage unit 42a stores an expectation value generated by the adding unit 35a. As described below with reference to FIG. 5, the table 43a pre-stores model-dependent items including model-dependent operations, the model-dependent items being items extracted from the logic specifications of the processor 12a.

The model-dependent operations refer to, in logic specifications of the processor 12a, operations corresponding to test items of undefined operations of the processor 12a. When the simulation unit 34a actually executes simulation of the processor 12a, not only a logic failure and a device failure of the processor 12b to be tested but also the model-dependent operations in the logic specifications may cause a mismatch between a result value and an expectation value. That is, when predetermined test instruction sequences are executed, model-dependent operations that may not be anticipated by the examiner may occur and thus there is a possibility in that processors of different models even with the same logic specifications perform execution operations of different test instruction sequences. Such operations of the processor 12a with respect to predetermined test instruction sequences are referred to as "model-dependent operations".

The fixed area 44a stores an interrupt handler generated by the fourth processing unit 37a. The interrupt handler is described below. The third storage unit 45a stores the result value generated by the processor 12b. The fourth storage unit 46a stores an error log generated by the processor 12b.

In accordance with an execution instruction issued by the fifth processing unit 38a, the processor 12b executes the test instruction sequence stored in the primary storage device 11a. The processor 12b stores, in the third storage unit 45a, the result value obtained through the execution of the test instruction sequence. When the test instruction sequence is not properly executed, the processor 12b outputs an error log to the fourth storage unit 46a.

The program 30a is a program in which processing of each of the first processing unit 31a, the second processing unit 32a, the third processing unit 33a, the simulation unit 34a, the adding unit 35a, the pre-checking unit 36a, the fourth processing unit 37a, the fifth processing unit 38a, the sixth processing unit 39a, and the seventh processing unit 40a is written in a programming language. By executing the program 30a, the processor 12a may execute the processing of each of the first processing unit 31a, the second processing unit 32a, the third processing unit 33a, the simulation unit 34a, the adding unit 35a, the pre-checking unit 36a, the fourth processing unit 37a, the fifth processing unit 38a, the sixth processing unit 39a, and the seventh processing unit 40a.

The first processing unit 31a controls the processing of each of the second processing unit 32a, the third processing unit 33a, the simulation unit 34a, the adding unit 35a, the pre-checking unit 36a, the fourth processing unit 37a, the fifth processing unit 38a, the sixth processing unit 39a, and the seventh processing unit 40a. The first processing unit 31a also performs control so as to cause the second processing unit 32a, the third processing unit 33a, the simulation unit 34a, the adding unit 35a, the pre-checking unit 36a, the fourth processing unit 37a, the fifth processing unit 38a, the sixth processing unit 39a, and the seventh processing unit 40a to share an event.

The second processing unit 32a generates a random number by using a pseudorandom-number generation algorithm. The first processing unit 31a checks whether the second processing unit 32a has output a random number. The first processing unit 31a then passes the generated random number to the third processing unit 33a in order to cause the third processing unit 33a to generate a test instruction sequence.

On the basis of the random number generated by the second processing unit 32a, the third processing unit 33a randomly generates a test instruction sequence.

On the basis of the random number generated by the second processing unit 32a, the third processing unit 33a selects the test instruction sequence stored in the first storage unit 41a and used for processor testing. On the basis of the random number passed from the second processing unit 32a, the third processing unit 33a also selects an operand from an operand table (not illustrated) stored in the first storage unit 41a.

The third processing unit 33a stores the selected test instruction sequence in the first storage unit 41a. The simulation unit 34a changes the test instruction sequence, generated by the third processing unit 33a, to a test instruction sequence to be executed by the fifth processing unit 38a.

The simulation unit 34a obtains an expectation value by executing the test instruction sequence generated by the third processing unit 33a. The simulation unit 34a causes the obtained expectation value to be stored in the second storage unit 42a.

The adding unit 35a obtains a model-dependent item from the table 43a and adds a test item regarding the model-dependent item. As a result of the adding unit 35a adding the test item, it is possible to obtain an expectation value pre-considering the model-dependent operation. Accordingly, using the expectation value pre-considering the model-dependent operation, the fifth processing unit 38a (described below) may verify the operation of the processor 12b.

The pre-checking unit 36a causes the simulation unit 34a to execute the model-dependent test instruction sequence, to thereby pre-check model-dependent operations.

The fourth processing unit 37a obtains the interrupt handler stored in the table 43a. The interrupt handler is processing triggered by an interrupt that occurs when a predetermined condition is satisfied. The predetermined condition in the first embodiment is, for example, a condition that the processor 12a specifies an invalid page in the cache memory 12a-1 in the processor 12a and executes an instruction. The term "invalid page" refers to, for example, data to be accessed being absent in the cache memory 12a-1 described above with reference to FIG. 1. When the fourth processing unit 37a specifies an invalid page and executes an instruction, an interrupt due to an access exception occurs and thus the interrupt handler is launched. The first processing unit 31a causes the fourth processing unit 37a to add the launched interrupt handler as an instruction subsequent to the test instruction sequence stored in the first storage unit 41a.

The fifth processing unit 38a has a function for executing the test instruction sequence by using the advanced control system of the processor 12a to be tested. When the third processing unit 33a confirms that a predetermined number of test instruction sequences are generated, the first processing unit 31a causes the fifth processing unit 38a to execute the test instruction sequences. The fifth processing unit 38a causes the processor 12b to store, in the third storage unit 45a, a result value resulting from the execution of the processor 12b. When the processor 12b does not properly execute the test instruction sequences, the fifth processing unit 38a causes the processor 12b to output an error log to the fourth storage unit 46a.

The sixth processing unit 39a has a function for comparing the expectation value stored in the second storage unit 42a with the result value stored in the third storage unit 45a. The first processing unit 31a causes the sixth processing unit 39a to output, to the output device 23a, a result of the comparison of the expectation value with the result value. When the expectation value and the result value match each other, the sixth processing unit 39a outputs, to the output device 23a, a result indicating that the processor 12b properly executed the test instruction sequence executed in advance by the simulation unit 34a. When the expectation value and the result value do not match each other, the sixth processing unit 39a outputs an error log to the seventh processing unit 40a.

Upon receiving a notification indicating that the expectation value and the result value do not match each other from the sixth processing unit 39a, the seventh processing unit 40a executes processing for outputting, to the output device 23a, one or more error logs stored in the seventh processing unit 40a.

Figure 3:
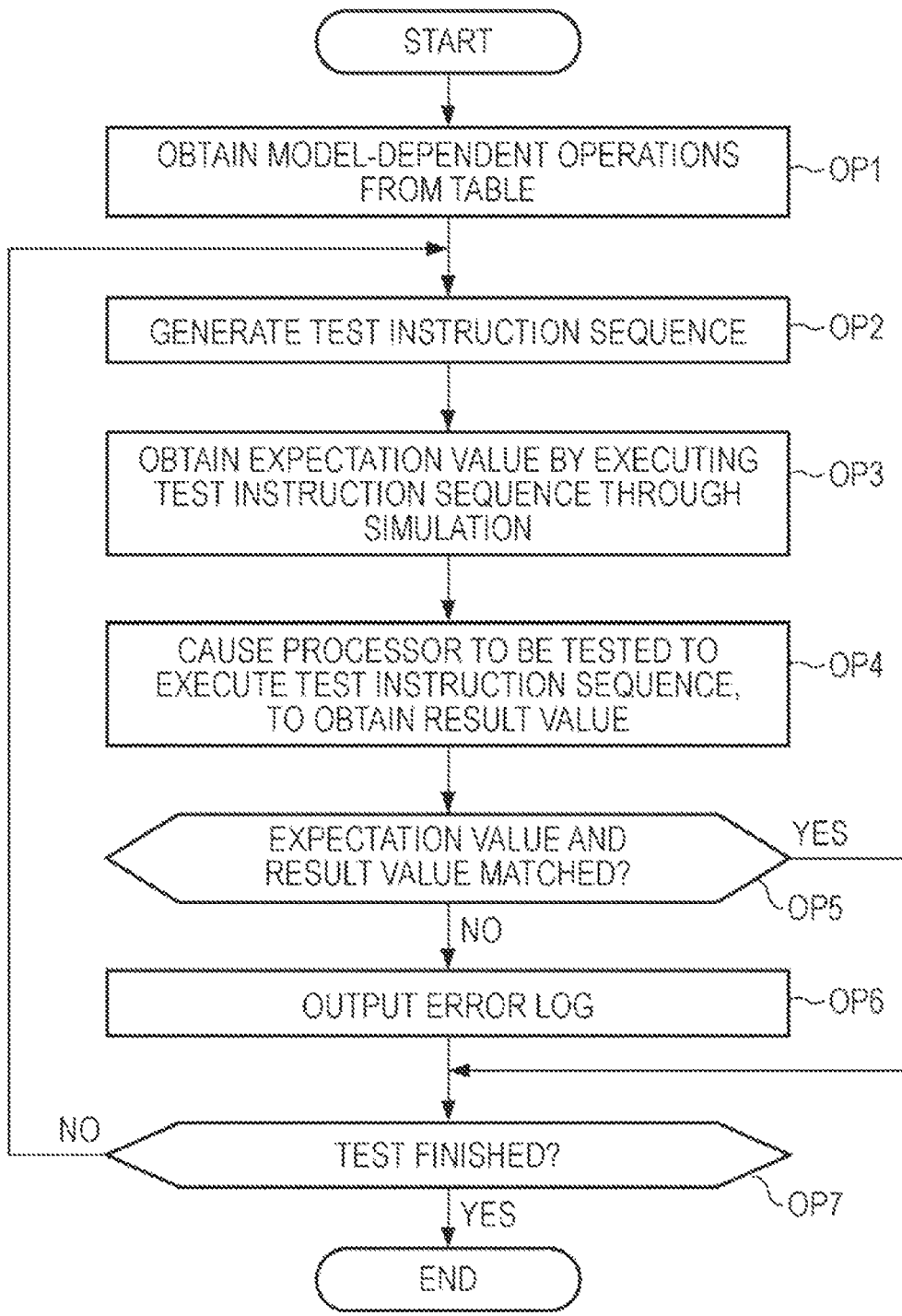
FIG. 3 is a flowchart of test-instruction-sequence execution processing performed by the processor testing apparatus according to the first embodiment.

FIG. 3 is a flowchart of test-instruction-sequence execution processing performed by the processor testing apparatus 20a according to the first embodiment. In the first embodiment, when the processor 12a executes the program 30a, processing of the first processing unit 31a to the seventh processing unit 40a is started. The first processing unit 31a issues an execution instruction to the second processing unit 32a to the seventh processing unit 40a that are in charge of the processing, in order to control execution timings of the second processing unit 32a to the seventh processing unit 40a in the operation pre-checking flowchart. In the following descriptions, a description for processing in which the first processing unit 31a issues processing instructions to the second processing unit 32a to the seventh processing unit 40a is omitted in order to avoid redundancy.

Before processing for executing a test instruction sequence is performed, in operation OP1, the adding unit 35a obtains, from the table 43a, model-dependent items including model-dependent operations of the processor 12a.

In operation OP2, the third processing unit 33a generates a test instruction sequence for testing the processor 12a by reflecting the model-dependent item including the model-dependent operation of the processor 12a, the model-dependent item being obtained by the adding unit 35a. The third processing unit 33a stores the generated test instruction sequence in the first storage unit 41a.

In operation OP3, the simulation unit 34a obtains an expectation value by executing the test instruction sequence in which the model-dependent items are reflected, the test instruction sequence being stored in the first storage unit 41a. The simulation unit 34a stores the obtained expectation value in the second storage unit 42a.

In operation OP4, the fifth processing unit 38a causes the processor 12b to be tested to execute the test instruction sequence in which the same model-dependent item is reflected, to thereby obtain a result value. The fifth processing unit 38a causes the processor 12b to store the result value, obtained by the processor 12b, in the third storage unit 45a.

In operation OP5, the sixth processing unit 39a performs comparison to determine whether or not the expectation value stored in the second storage unit 42a and the result value stored in the third storage unit 45a match each other. When the expectation value and the result value match each other (YES in operation OP5), the process proceeds to operation OP7 in which the first processing unit 31a determines whether or not the processor testing apparatus 20a is to finish the testing of the processor 12b. Upon determining that the processor testing apparatus 20a is to finish the testing of the processor 12b (YES in operation OP7), the first processing unit 31a ends the test-instruction-sequence execution processing performed by the processor testing apparatus 20a. When the first processing unit 31a determines that the processor testing apparatus 20a is not to finish the testing of the processor 12b (NO in operation OP7), the process returns to operation OP2.

When the expectation value and the result value do not match each other (NO in operation OP5), the process proceeds to operation OP6 in which the sixth processing unit 39a outputs a notification indicating a mismatch between the expectation value and the result value, i.e., an error log, to the seventh processing unit 40a. After the error log is output, the process of the first processing unit 31a proceeds to operation OP7. Since the processor testing apparatus 20a according to the first embodiment verifies the operation of the processor 12b by using the expectation value pre-considering the model-dependent operation, it is possible to perform efficient operation verification of the processor 12b. In addition, since the operation verification may be executed independently of the model-dependent operation, the accuracy of the operation verification of the processor 12b may be improved.

Figure 4:
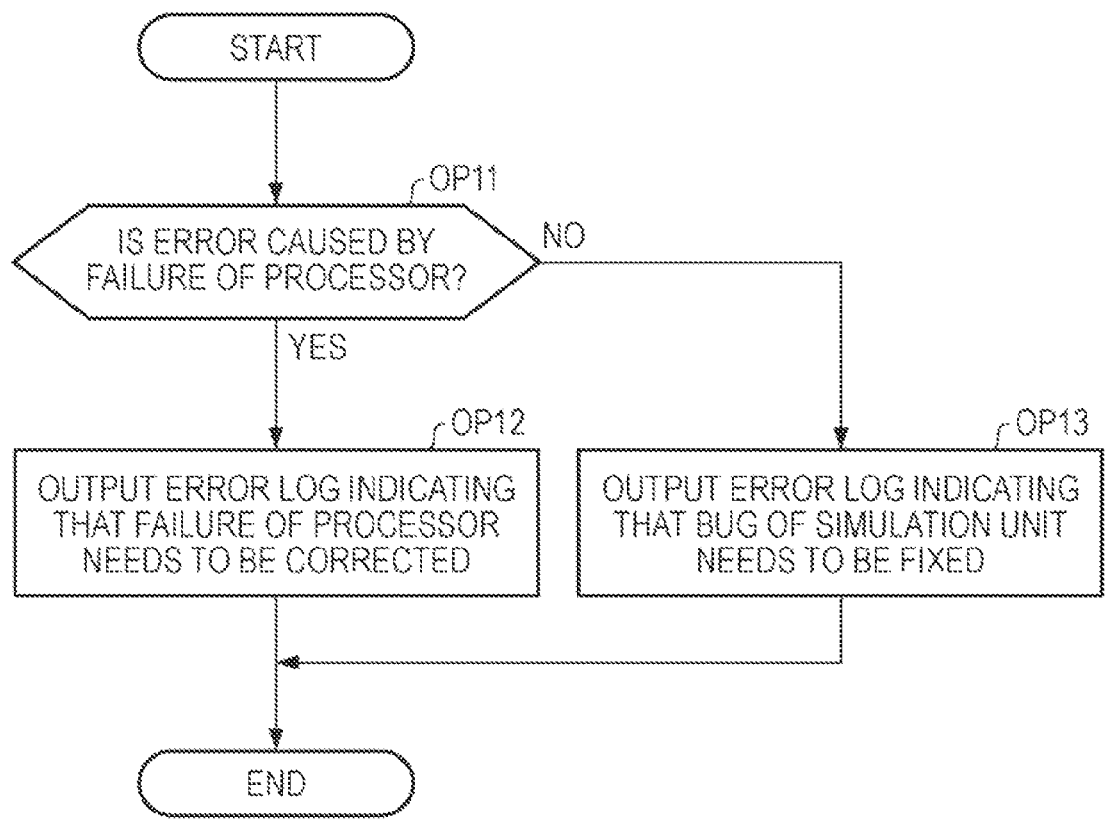
FIG. 4 is a flowchart of the operation of the processor testing apparatus according to the first embodiment.

FIG. 4 is a flowchart illustrating the operation of the processor testing apparatus 20a according to the first embodiment. More specifically, FIG. 4 is a flowchart illustrating processing performed when an error log is output from the sixth processing unit 39a or the fourth storage unit 46a illustrated in FIG. 3 to the seventh processing unit 40a. In FIG. 4, elements that are substantially the same as those illustrated in FIGS. 1 to 3 are denoted by the same reference numerals, and descriptions thereof are not given hereinafter.

When an error log is output from the sixth processing unit 39a or the fourth storage unit 46a to the seventh processing unit 40a, the seventh processing unit 40a makes a determination in operation OP11 as to whether or not a cause of error is a failure of the processor 12b to be tested. Upon determining that the cause of the error is a failure of the processor 12b (YES in operation OP11), the process proceeds to operation OP12 in which the seventh processing unit 40a outputs, to the output device 23a, an error log indicating that the failure of the processor 12b needs to be corrected. On the other hand, upon determining that the cause of the error is not the failure of the processor 12b (NO in operation OP11), the process proceeds to operation OP13 in which the seventh processing unit 40a outputs, to the output device 23a, an error log indicating that a bug of the simulation unit 34a needs to be fixed.

Figure 5:
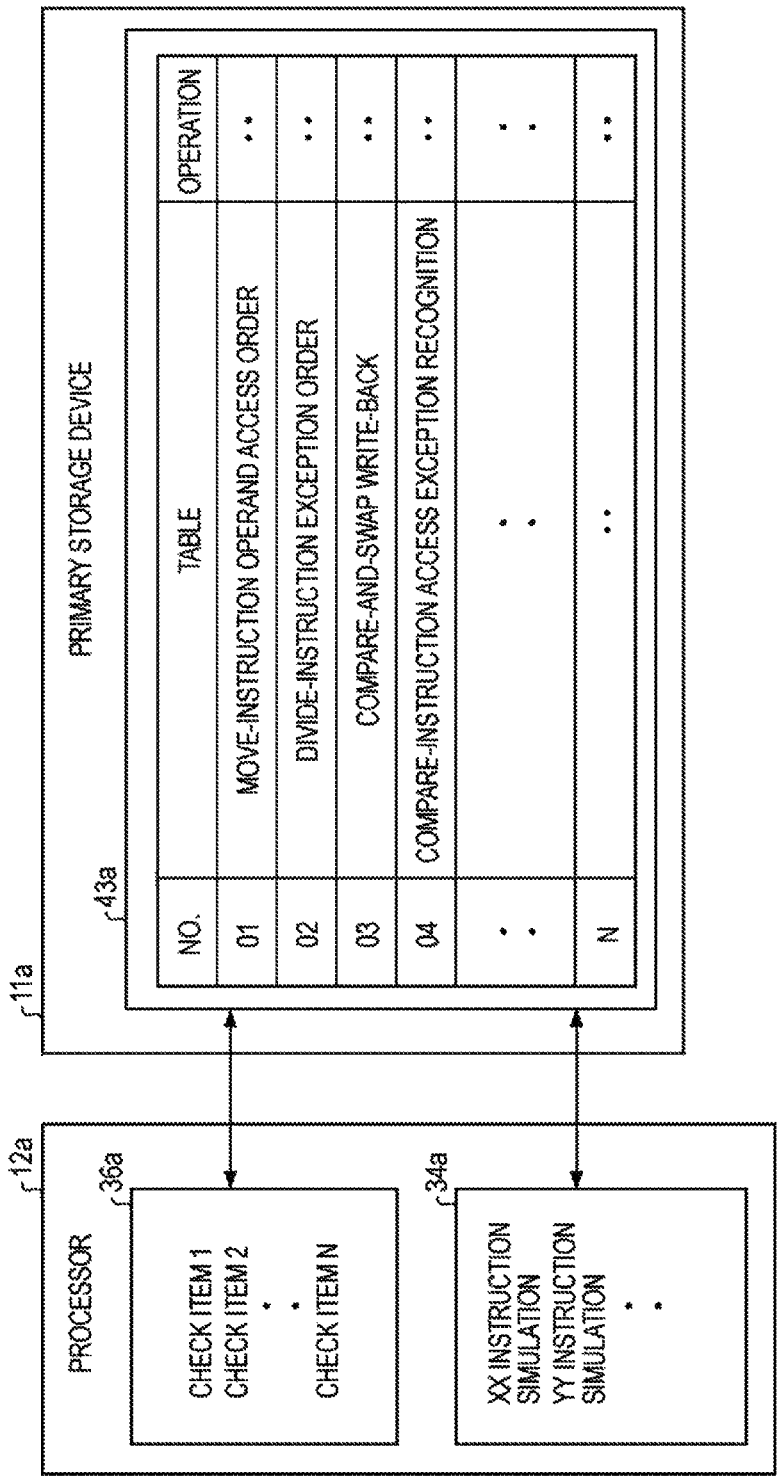
FIG. 5 is a diagram illustrating processing of the processor testing apparatus according to the first embodiment.

FIG. 5 is a diagram illustrating the processing of the processor testing apparatus 20a according to the first embodiment. In the diagram of FIG. 5 illustrating the processing of the processor testing apparatus 20a, elements that are substantially the same as those illustrated in FIGS. 1 to 4 are denoted by the same reference characters, and descriptions thereof are not given hereinafter.

The table 43a stores items that depend on the model-dependent operations, the items being extracted from the logic specifications of the processor 12a. Examples of the model-dependent items stored in the table 43a include a move-instruction operand access order, a divide-instruction exception order, a compare-and-swap write-back, and a compare-instruction access exception recognition. The items that depend on logic-dependent operations are those typically used in the logic specifications of the processor 12a.

Two or more finite options are pre-set for each model-dependent item. For example, when the model-dependent item is the move-instruction operand access order, two operation types are set to indicate which of access exceptions of the operands op1 and op2 is to be given priority in the operand access order. An order specified by an instruction having an exception condition including a data exception, division exception, or write protection exception indicates priority in the operand access order. Operations defined based on the logic specifications of processors are incorporated into the processors. Thus, it has been thought that, even for processors of various models whose model numbers and revision numbers are different, simulation may be able to be executed using the same simulator if the logic specifications are the same. However, execution of actual simulation revealed that there are cases in which not only a logic failure or a processor-device failure but also model-dependent operations in the logic specifications cause a mismatch between the result value and the expectation value. Accordingly, when the model-dependent operations are executed by the processor 12a, there is a possibility in that processors of different models even with the same logic specifications perform execution operations of different test instruction sequences.

The pre-checking unit 36a predicts model-dependent operations on the basis of the logic specifications of the processor 12a, selects some highly likely model-dependent items from the table 43a, and causes the simulation unit 34a to execute the selected model-dependent items. The pre-checking unit 36a causes a result of item checking executed by the processor 12a to be stored in the table 43a.

As described above, two or more finite options are pre-set for each of the model-dependent items extracted by the pre-checking unit 36a and stored in the table 43a. That is, multiple predictable options are set for each model-dependent item. Since the multiple predictable options are set, the fifth processing unit 38a may verify the operation of the processor 12b by using the expectation values associated with the model-dependent operations of the processor 12a. The items checked by the pre-checking unit 36a are items of statically written instructions associated with the model-dependent items. The pre-checking unit 36a causes the processor 12a to execute the statically written instructions, to thereby check the operations of the model-dependent items of the processor 12a. On the basis of a result of the checking performed by the pre-checking unit 36a, operation types are set in the table 43a in association with the corresponding model-dependent items. When a result of the checking of all of the model-dependent items extracted by the pre-checking unit 36a is other than any of the pre-set operation types, no flag is set and the operation result other than the options is determined to be a failure of the processor 12a.

For simulating the operations of model-dependent items for the processor 12b to be tested, the simulation unit 34a refers to the table 43a to determine operation details of the simulation unit 34a. By referring to the table 43a, the simulation unit 34a may perform simulation adapted for the processor 12b to be tested.

Figure 6:
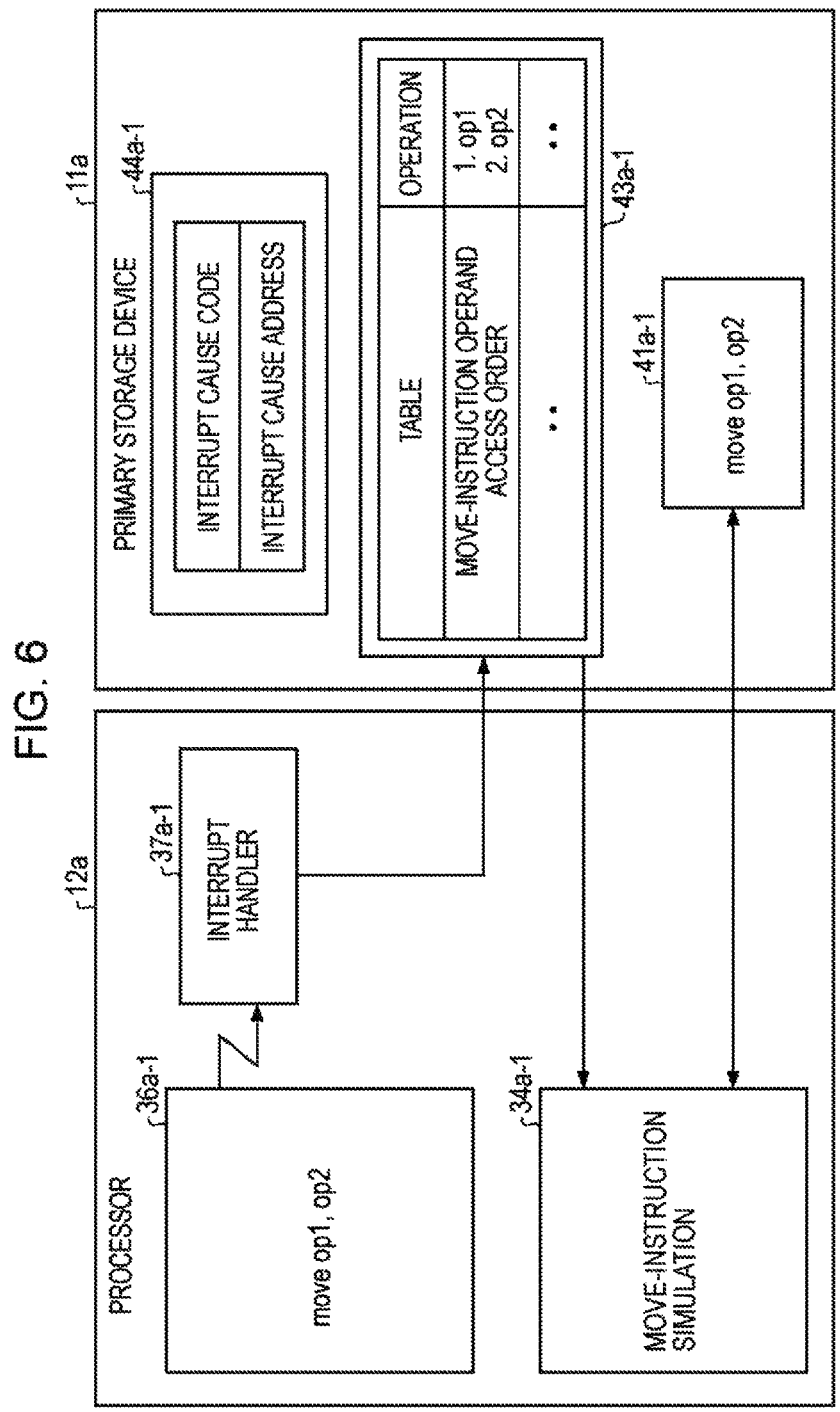
FIG. 6 is a diagram illustrating the processing of the processor testing apparatus according to the first embodiment.

FIG. 6 is a diagram illustrating the processing of the processor testing apparatus 20a according to the first embodiment. In the diagram of FIG. 6 illustrating the processing of the processor testing apparatus 20a, elements that are substantially the same as those illustrated in FIGS. 1 to 5 are denoted by the same reference characters, and descriptions thereof are not given hereinafter. The model-dependent operation of the processor 12a in the first embodiment is a move-instruction operand access order described below.

In FIG. 6, a pre-checking unit 36a-1 checks, for example, an operand access order of an instruction having two operands. For an instruction for moving data between addresses in the primary storage device 11a serving as a memory (the instruction is hereinafter referred to as a "move instruction"), the pre-checking unit 36a-1 specifies invalid pages that are different from each other with respect to the address of an operand op1 and the address of an operand op2 and executes a move instruction. The invalid page indicates that data to be accessed is not stored in a first storage unit 41a-1. The invalid page holds invalid data.

When the invalid page in the first storage unit 41a-1 is accessed, a fourth processing unit 37a-1 launches an interrupt handler due to an access exception. After accessing the invalid page in the first storage unit 41a-1, the interrupt handler checks which of the operands op1 and op2 is to be accessed first. The first processing unit 31a causes the fourth processing unit 37a-1 to add the launched interrupt handler as an instruction subsequent to the test instruction sequence stored in the first storage unit 41a-1.

At the same time the interrupt handler is launched, the processor 12a stores, as an interrupt status, an interrupt cause code and an interrupt cause address in the fixed area 44a-1 in the table 43a-1. The interrupt handler launched by the fourth processing unit 37a-1 determines which of the operands caused the access exception, on the basis of the interrupt cause code and the interrupt cause address. The interrupt handler sets the operands in corresponding entries in the table 43a-1, with first priority being given to the operand that caused the exception and second priority being given to the operand that did not cause the exception.

After the fourth processing unit 37a-1 launches the interrupt handler due to the access exception, the operation type of extracted model-dependent item is set in the table 43a-1. A move-instruction operand access order is set in an "operation" field in the table 43a-1 in the first embodiment. The operation types set for the items in the table 43a-1 includes two finite options, i.e., an operand op1 and an operand op2.

For simulating the operations of the model-dependent items for the processor 12b to be tested, the simulation unit 34a-1 refers to the table 43a-1 to determine operation details of the simulation unit 34a-1. By referring to the table 43a-1, the simulation unit 34a-1 performs simulation adapted for the processor 12b to be tested. The model-dependent operation of the processor 12a in the first embodiment is a move-instruction operand access order.

In the first embodiment, the simulation unit 34a-1 determines which of the access exceptions of the operands op1 and op2 is to be given priority. Next, with respect to the move instruction stored in the first storage unit 41a-1, the simulation unit 34a-1 specifies invalid pages that are different from each other with respect to the address of the operand op1 and the address of the operand op2 and executes instruction simulation for determining which of the access exceptions of the operands op1 and op2 is to be given priority. An access exception condition in the first embodiment is a case in which the operand op exists outside the area of addresses in the primary storage device 11a serving as a memory, a case in which an operand op is swapped to an external storage and is thus not stored in the primary storage device 11a, or a case in which writing to the primary storage device 11a is not performed since protection of access restriction is set for the primary storage device 11a.

The simulation unit 34a-1 checks whether or not an access exception is present for the operand op1 of two operands op1 and op2 on which the move instruction is to be executed. In the presence of the access exception condition, the simulation unit 34a-1 refers to the corresponding table 43a-1 to determine whether or not a flag indicating that the access exception condition is present for the operand op1 is on. Next, the simulation unit 34a-1 checks the presence/absence of an access exception for the operand op2 for the move instruction. In the presence of the access exception condition, the simulation unit 34a-1 refers to the table 43a-1 to determine whether or not a flag indicating that the access exception condition is present for the operand op2 is on. As described above, the simulation unit 34a-1 performs simulation for the access exception for the operand op1, in accordance with the state of the flag. Alternatively, the simulation unit 34a-1 may perform simulation for an access exception for the operand op2. Alternatively, the simulation unit 34a-1 may perform simulation for inter-memory movement for the move instruction. As a result, it is possible to determine an expectation value resulting from the simulation considering the model-dependent item.

Figure 7:
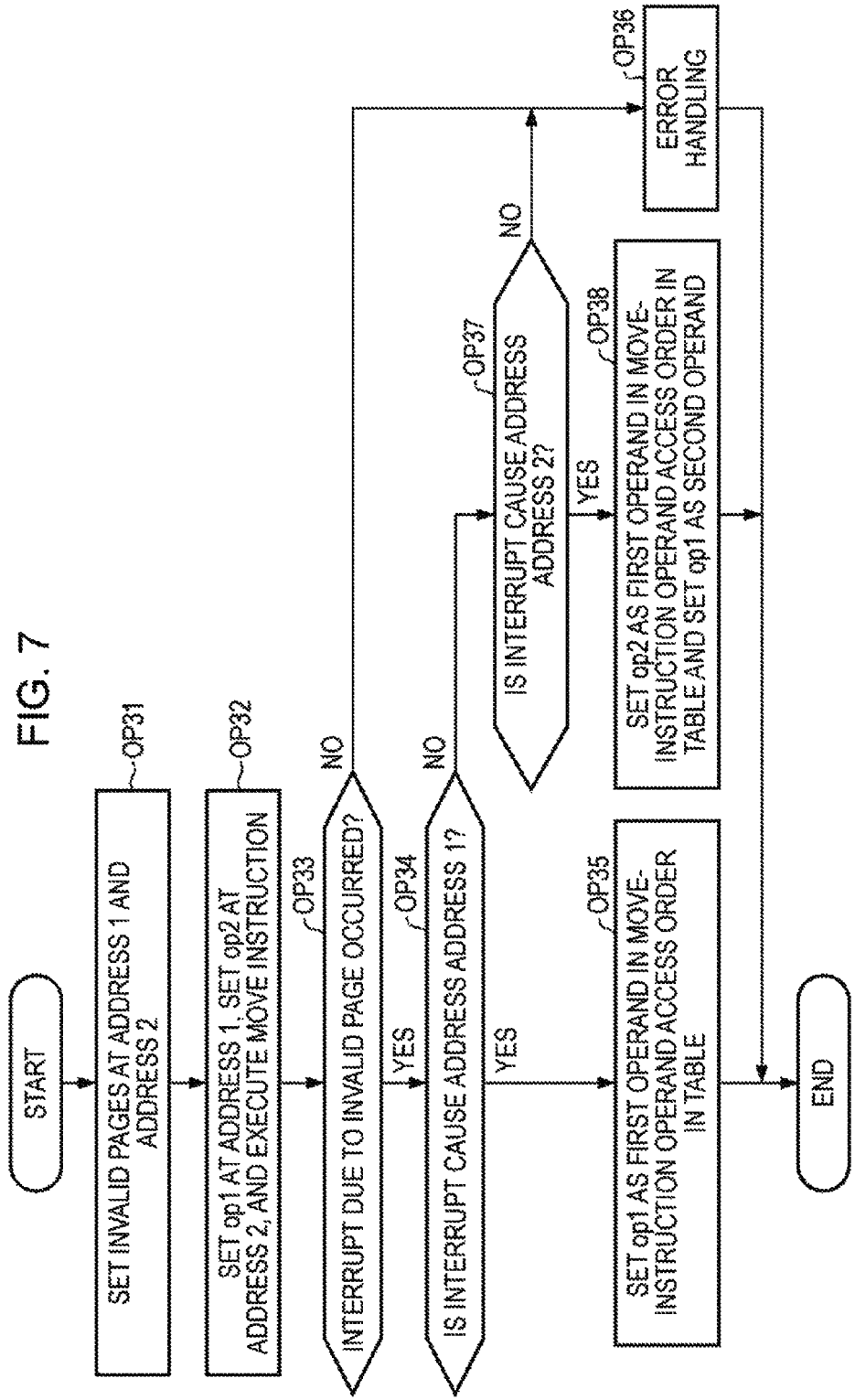
FIG. 7 is a flowchart of a pre-checking operation of the processor testing apparatus according to the first embodiment.

FIG. 7 is a flowchart illustrating operation pre-checking of the processor testing apparatus 20a according to the first embodiment. In FIG. 7, elements that are substantially the same as those illustrated in FIGS. 1 to 6 are denoted by the same reference numerals and descriptions thereof are not given hereinafter.

The flowchart illustrated in FIG. 7 has three conditional-branching processing operations, i.e., operations OP33, OP34, and OP37. Depending on these conditional-branching operations, the flowchart illustrated in FIG. 7 has the following combinations of processing operations.

Operation Pre-Checking Flow 1: YES in OP33 and YES in OP34

Operation Pre-Checking Flow 2: NO in OP33

Operation Pre-Checking Flow 3: YES in OP33, NO in OP34, and YES in OP37

Operation Pre-Checking Flow 4: YES in OP33, NO in OP34, and NO in OP37

The four flows noted above will be described below with reference to FIG. 7. In FIG. 7, elements that are substantially the same as those illustrated in FIGS. 1 to 6 are denoted by the same reference numerals, and descriptions thereof are not given hereinafter.

In operation OP31, the third processing unit 33a sets invalid pages at address 1 and address 2 in the primary storage device 11a. In operation OP32, the pre-checking unit 36a-1 sets an operand op1 at address 1, sets an operand op2 at address 2, and executes a move instruction. In operation OP33, the pre-checking unit 36a-1 determines whether or not an interrupt due to an invalid page occurred.

In the case of the operation pre-checking flow 1, since an interrupt due to an invalid page occurs (YES in operation OP33), the process proceeds to operation OP34 in which the pre-checking unit 36a-1 determines whether or not the interrupt cause address is address 1. In the case of the operation pre-checking flow 1, since the interrupt cause address is address 1 (YES in operation OP34), the process proceeds to operation OP35 in which the fourth processing unit 37a-1 sets the operand op1 as a first operand in the move-instruction-operand access order in the table 43a-1. In operation OP35, the fourth processing unit 37a-1 further sets the operand op2 as a second operand in the move-instruction operand access order in the table 43a-1.

In operation OP32, the pre-checking unit 36a-1 sets an operand op1 at address 1, sets an operand op2 at address 2, and executes a move instruction. In operation OP33, the pre-checking unit 36a-1 determines whether or not an interrupt due to an invalid page occurred. In the case of the operation pre-checking flow 2, since an interrupt due to an invalid page does not occur (NO in operation OP33), the process proceeds to operation OP36 in which the seventh processing unit 40a performs error handling, for example, for outputting an error log to the output device 23a.

In operation OP32, the pre-checking unit 36a-1 sets an operand op1 at address 1, sets an operand op2 at address 2, and executes a move instruction. In operation OP33, the pre-checking unit 36a-1 determines whether or not an interrupt due to an invalid page occurred.

In the case of the operation pre-checking flow 3, since an interrupt due to an invalid page occurs (YES in operation OP33), the process proceeds to operation OP34 in which the pre-checking unit 36a-1 determines whether or not the interrupt cause address is address 1. In the case of the operation pre-checking flow 3, since the interrupt cause address is not address 1 (NO in operation OP34), the process proceeds to operation OP37 in which the pre-checking unit 36a-1 determines whether or not the interrupt cause address is address 2. In the case of the operation pre-checking flow 3, since the interrupt cause address is address 2 (YES in operation OP37), the process proceeds to operation OP38 in which the fourth processor 37a-1 sets the operand op2 as a first operand in the move-instruction-operand access order in the table 43a-1. In operation OP38, the fourth processing unit 37a-1 further sets the operand op1 as a second operand in the move-instruction operand access order in the table 43a-1.

In operation OP32, the pre-checking unit 36a-1 sets an operand op1 at address 1, sets an operand op2 at address 2, and executes a move instruction. In operation OP33, the pre-checking unit 36a-1 determines whether or not an interrupt due to an invalid page occurred.

In the case of the operation pre-checking flow 4, since an interrupt due to an invalid page occurs (YES in operation OP33), the process proceeds to operation OP34 in which the pre-checking unit 36a-1 determines whether or not the interrupt cause address is address 1. In the case of the operation pre-checking flow 4, since the interrupt cause address is not address 1 (NO in operation OP34), the process proceeds to operation OP37 in which the pre-checking unit 36a-1 determines whether or not the interrupt cause address is address 2. In the case of the operation pre-checking flow 4, since the interrupt cause address is not address 2 (NO in operation OP37), the process proceeds to operation OP36 in which the seventh processing unit 40a performs error handling, for example, for outputting an error log to the output device 23a.

Figure 8:
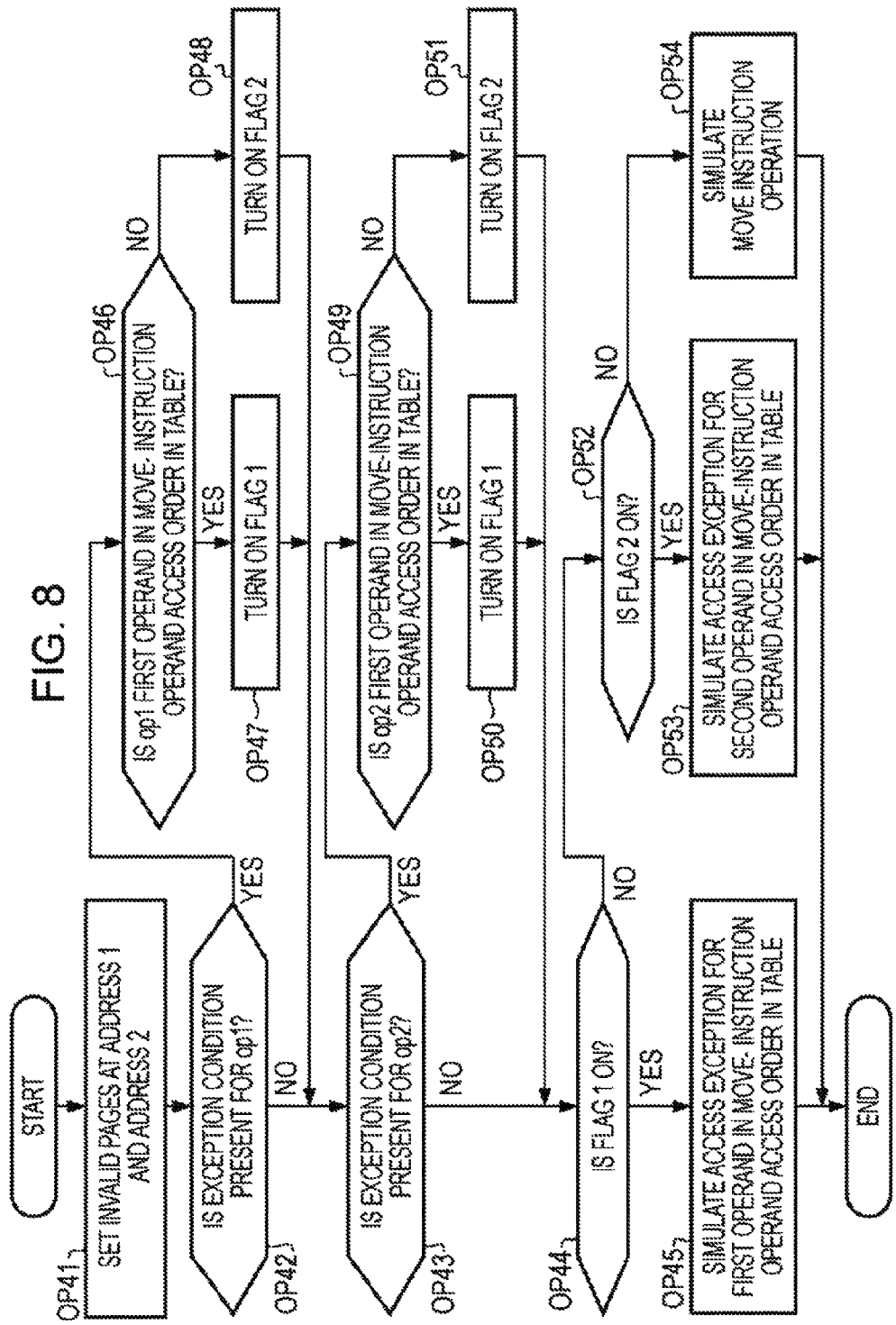
FIG. 8 is a flowchart of an instruction simulation operation of the processor testing apparatus according to the first embodiment.

FIG. 8 is a flowchart illustrating an instruction simulation operation of the processor testing apparatus 20a according to the first embodiment. In FIG. 8, elements that are substantially the same as those illustrated in FIGS. 1 to 7 are denoted by the same reference numerals, and descriptions thereof are not given hereinafter.

The flowchart illustrated in FIG. 8 has sixth conditional-branching processing operations, i.e., operations OP42, OP43, OP44, OP46, OP49, and OP52. Depending on these conditional-branching operations, the flowchart illustrated in FIG. 8 has the following combinations of processing operations.

Instruction Simulation Operation Flow 1: YES in OP42, YES in OP46, NO in OP43, and YES in OP44

Instruction Simulation Operation Flow 2: YES in OP42, NO in OP46, NO in OP43, NO in OP44, and YES in OP52

Instruction Simulation Operation Flow 3: NO in OP42, YES in OP43, YES in OP49, and YES in OP44

Instruction Simulation Operation Flow 4: NO in OP42, YES in OP43, NO in OP49, NO in OP44, and YES in OP52

Instruction Simulation Operation Flow 5: NO in OP42, NO in OP43, NO in OP44, and NO in OP52

The five flows noted above will be described below with reference to FIG. 8. In the following descriptions, a description for processing in which the first processing unit 31a issues processing instructions to the second processing unit 32a to the seventh processing unit 40a is omitted in order to avoid redundancy, as in FIG. 7.

In operation OP41, the simulation unit 34a-1 sets invalid pages at address 1 and address 2 in the primary storage device 11a. In operation OP42, the simulation unit 34a-1 determines whether or not an exception condition is present for the operand op1 stored in the first storage unit 41a-1.

In the case of the instruction simulation operation flow 1, since an exception condition is present for the operand op1 stored in the first storage unit 41a-1 (YES in operation OP42), the process proceeds to operation OP46 in which the simulation unit 34a-1 determines whether or not the operand op1 is the first operand in the move-instruction operand access order in the table 43a-1. In the case of the instruction simulation operation flow 1, since the operand op1 is the first operand in the move-instruction operand access order (YES in operation OP46), the process proceeds to operation OP47 in which the simulation unit 34a-1 refers to the table 43a-1 to turn on an operation flag 1 indicating that the operand op1 is the first operand.

In operation OP43, the simulation unit 34a-1 determines whether or not an exception condition is present for the operand op2 stored in the first storage unit 41a-1. In the case of the instruction simulation operation flow 1, since no exception condition is present for the operand op2 (NO in operation OP43), the process proceeds to operation OP44 in which the simulation unit 34a-1 refers to the table 43a-1 to determine whether or not the operation flag 1 indicating that the operand op1 is the first operand is on. In the case of the instruction simulation operation flow 1, since the operation flag 1 is on (YES in operation OP44), the process proceeds to operation OP45 in which the simulation unit 34a-1 simulates the access exception for the operand op1 that is the first operand in the move-instruction operand access order in the table 43a-1.

In operation OP41, the simulation unit 34a-1 sets invalid pages at address 1 and address 2 in the primary storage device 11a. In operation OP42, the simulation unit 34a-1 determines whether or not an exception condition is present for the operand op1 stored in the first storage unit 41a-1.

In the case of the instruction simulation operation flow 2, since an exception condition is present for the operand op1 stored in the first storage unit 41a-1 (YES in operation OP42), the process proceeds to operation OP46 in which the simulation unit 34a-1 determines whether or not the operand op1 is the first operand in the move-instruction operand access order in the table 43a-1. In the case of the instruction simulation operation flow 2, since the operand op1 is not the first operand in the move-instruction operand access order (NO in operation OP46), the process proceeds to operation OP48 in which the simulation unit 34a-1 refers to the table 43a-1 to turn on an operation flag 2 indicating that the operand op1 is the second operand.

In operation OP43, the simulation unit 34a-1 determines whether or not an exception condition is present for the operand op2 stored in the first storage unit 41a-1. In the case of the instruction simulation operation flow 2, since no exception condition is present for the operand op2 (NO in operation OP43), the process proceeds to operation OP44 in which the simulation unit 34a-1 refers to the table 43a-1 to determine whether or not the operation flag 1 indicating that the operand op1 is the first operand is on. In the case of the instruction simulation operation flow 2, since the operation flag 1 is not on (NO in operation OP44), the process proceeds to operation OP52 in which the simulation unit 34a-1 determines whether or not the operation flag 2 indicating that the operand op1 is the second operand is on. In the case of the instruction simulation operation flow 2, since the operation flag 2 is on (YES in operation OP52), the process proceeds to operation OP53 in which the simulation unit 34a-1 simulates the access exception for the operand op2 that is the second operand in the move-instruction operand access order in the table 43a-1.

In operation OP41, the simulation unit 34a-1 sets invalid pages at address 1 and address 2 in the primary storage device 11a. In operation OP42, the simulation unit 34a-1 determines whether or not an exception condition is present for the operand op1 stored in the first storage unit 41a-1. In the case of the instruction simulation operation flow 3, since no exception condition is present for the operand op1 (NO in operation OP42), the process proceeds to operation OP43 in which the simulation unit 34a-1 determines whether or not an exception condition is present for the operand op2 stored in the first storage unit 41a-1.

In the case of the instruction simulation operation flow 3, since an exception condition is present for the operand op2 stored in the first storage unit 41a-1 (YES in operation OP43), the process proceeds to operation OP49 in which the simulation unit 34a-1 determines whether or not the operand op2 is the first operand in the move-instruction operand access order in the table 43a-1. In the case of the instruction simulation operation flow 3, since the operand op2 is the first operand in the move-instruction operand access order (YES in operation OP49), the process proceeds to operation OP50 in which the simulation unit 34a-1 refers to the table 43a-1 to turn on an operation flag 1 indicating that the operand op2 is the first operand.

In operation OP44, the simulation unit 34a-1 refers to the table 43a-1 to determine whether or not the operation flag 1 is on. In the case of the instruction simulation operation flow 3, since the operation flag 1 indicating that the operand op2 is the first operand is on (YES in operation OP44), the process proceeds to operation OP45 in which the simulation unit 34a-1 simulates the access exception for the operand op1 that is the first operand in the move-instruction operand access order in the table 43a-1.

In operation OP41, the simulation unit 34a-1 sets invalid pages at address 1 and address 2 in the primary storage device 11a. In operation OP42, the simulation unit 34a-1 determines whether or not an exception condition is present for the operand op1 stored in the first storage unit 41a-1. In the case of the instruction simulation operation flow 4, since no exception condition is present for the operand op1 (NO in operation OP42), the process proceeds to operation OP43 in which the simulation unit 34a-1 determines whether or not an exception condition is present for the operand op2 stored in the first storage unit 41a-1.

In the case of the instruction simulation operation flow 4, since an exception condition is present for the operand op2 stored in the first storage unit 41a-1 (YES in operation OP43), the process proceeds to operation OP49 in which the simulation unit 34a-1 determines whether or not the operand op2 is the first operand in the move-instruction operand access order in the table 43a-1. In the case of the instruction simulation operation flow 4, since the operand op2 is not the first operand in the move-instruction operand access order (NO in operation OP49), the process proceeds to operation OP51 in which the simulation unit 34a-1 refers to the table 43a-1 to turn on an operation flag 2 indicating that the operand op2 is the second operand.

In operation OP44, the simulation unit 34a-1 refers to the table 43a-1 to determine whether or not the operation flag 1 indicating that the operand op2 is the first operand is on. In the case of the instruction simulation operation flow 4, since the operation flag 1 is not on (NO in operation OP44), the process proceeds to operation OP52 in which the simulation unit 34a-1 determines whether or not the operation flag 2 indicating that the operand op2 is the second operand is on. In the case of the instruction simulation operation flow 4, since the operation flag 2 is on (YES in operation OP52), the process proceeds to operation OP53 in which the simulation unit 34a-1 simulates the access exception for the operand op2 that is the second operand in the move-instruction operand access order in the table 43a-1.

In operation OP41, the simulation unit 34a-1 sets invalid pages at address 1 and address 2 in the primary storage device 11a. In operation OP42, the simulation unit 34a-1 determines whether or not an exception condition is present for the operand op1 stored in the first storage unit 41a-1. In the case of the instruction simulation operation flow 5, since no exception condition is present for the operand op1 (NO in operation OP42), the process proceeds to operation OP43 in which the simulation unit 34a-1 determines whether or not an exception condition is present for the operand op2 stored in the first storage unit 41a-1.

In the case of the instruction simulation operation flow 5, since no exception condition is present for the operand op2 (NO in operation OP43), the process proceeds to operation OP44 in which the simulation unit 34a-1 refers to the table 43a-1 to determine whether or not the operation flag 1 is on. In the case of the instruction simulation operation flow 5, since the operation flag 1 is not on (NO in operation OP44), the process proceeds to operation OP52 in which the simulation unit 34a-1 determines whether or not the operation flag 2 is on. In the case of the instruction simulation operation flow 5, since the operation flag 2 is not on (NO in operation OP52), the process proceeds to operation OP54 in which the simulation unit 34a-1 simulates a move instruction operation between addresses 1 and 2 in the primary storage device 11a.

According to the technology disclosed in the first embodiment, the processor testing apparatus 20a according to the first embodiment may determine an expectation value resulting from the simulation pre-considering the move-instruction operand access order as a model-dependent operation. Thus, since the expectation value is used to verify the operation of the processor 12b, no complicated process is desirable and the operation of the processor 12b may be verified efficiently. In addition, since the operation verification may be executed independently of the model-dependent operation, the accuracy of the operation verification of the processor 12b may be improved.

A second embodiment will be described below with reference to FIGS. 9 to 14.

Figure 9:
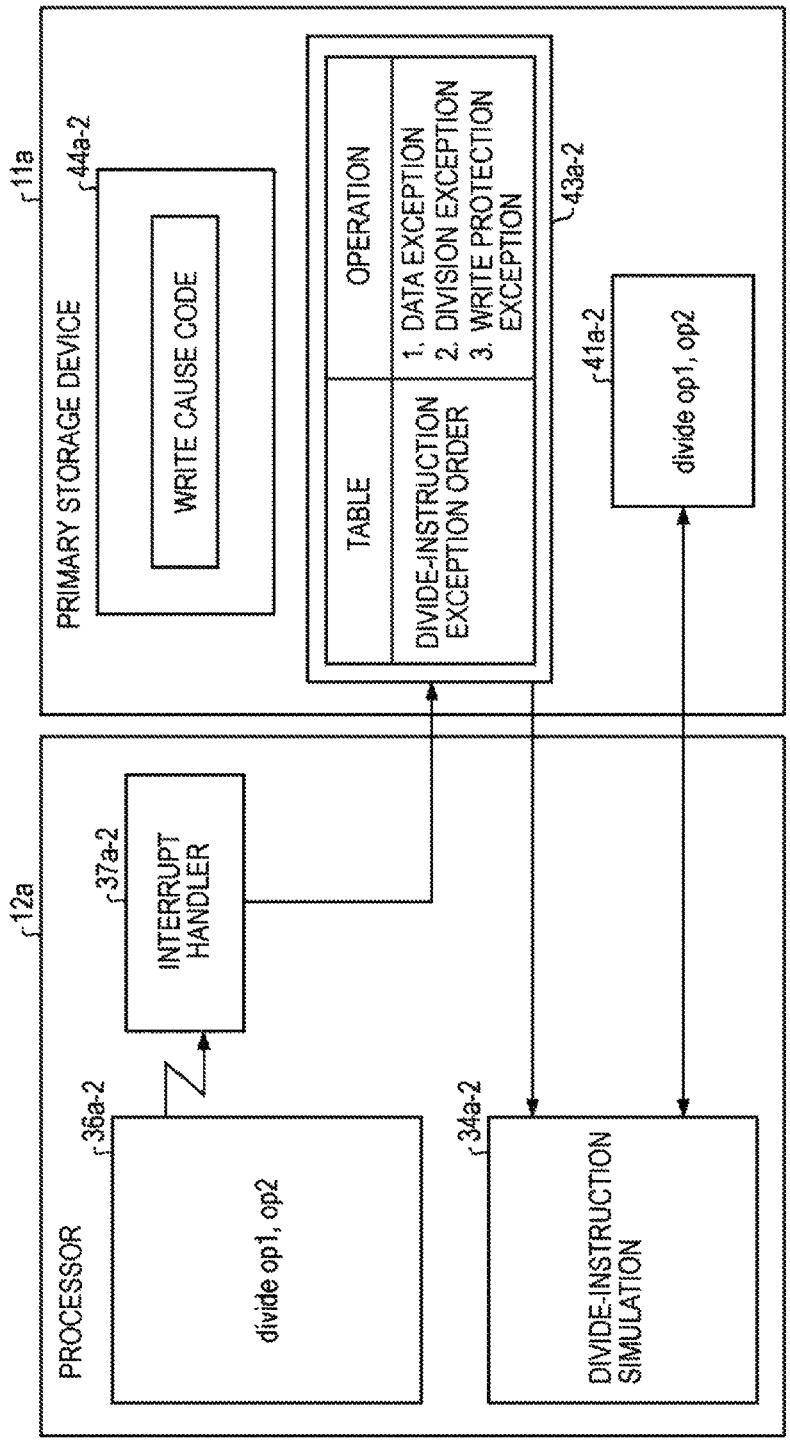
FIG. 9 is a diagram illustrating processing of a processor testing apparatus according to a second embodiment.

FIG. 9 is a diagram illustrating processing of a processor testing apparatus 20a according to a second embodiment. In the diagram of FIG. 9 illustrating processing of the processor testing apparatus 20a, elements that are substantially the same as those illustrated in FIGS. 1 to 6 in the first embodiment are denoted by the same reference characters, and descriptions thereof are not given hereinafter. The model-dependent operation of the processor 12a in the second embodiment is a divide-instruction exception order described below.

A pre-checking unit 36a-2 checks two operands op1 and op2 stored in a primary storage device 11a. With respect to a division instruction formulating data of operand op1 and data of operand op2 (the instruction is hereinafter referred to as a "divide instruction"), the pre-checking unit 36a-2 sets an improper format for the data of the first operand op1, sets a write protection exception condition for the primary storage device 11a, specifies 0 for the value of the second operand op2, and executes a divide instruction.

When the divide instruction is executed on two operands op1 and op2 stored in the primary storage device 11a, an interrupt due to any of a data exception, division exception, and write protection exception occurs to thereby cause a fourth processing unit 37a-2 to launch an interrupt handler. After the divide instruction is executed on the two operands op1 and op2 stored in a first storage unit 41a-2, the interrupt handler checks which of the data exception, the division exception, and the write protection exception occurred first. The first processing unit 31a causes the fourth processing unit 37a-2 to add the launched interrupt handler as an instruction subsequent to the test instruction sequence stored in the first storage unit 41a-2.

At the same time the interrupt handler is launched, the processor 12a stores, as an interrupt status, an interrupt cause code in the fixed area 44a-2 in the table 43a-2. That is, simultaneously with an interrupt, the interrupt handler launched by the fourth processing unit 37a-2 stores, as an interrupt status, an interrupt cause code in the fixed area 44a-2. On the basis of the interrupt cause code, the interrupt handler determines which of the exceptions caused the interrupt. The interrupt handler sets the determined exception cause in a corresponding entry in the table 43a-2a as first priority. Next, the interrupt handler sets the remaining two exceptions for the operands op1 and op2 for the divide instruction. The interrupt handler then causes the divide instruction to be executed again. The interrupt handler sets, in the table 43a-2, second priority for the exception cause for an interrupt at this point and sets third priority for the remaining exception cause.

For simulating the operation of the model-dependent item for the processor 12b to be tested, the simulation unit 34a-2 refers to the table 43a-2 to determine the operation of the simulation unit 34a-2. By referring to the table 43a-2, the simulation unit 34a-2 performs simulation adapted for the processor 12b to be tested. The model-dependent operation of the processor 12a in the second embodiment is a divide-instruction exception order.

In the second embodiment, when multiple exception causes are present for the divide instruction during execution of the test instruction sequence, the simulation unit 34a-2 refers to the table 43a-2 to determine which exception is to be given priority and performs simulation for the divide instruction. First, the simulation unit 34a-2 checks whether or not data of the operand op1 or op2 of the divide instruction has an improper format. When the data has an improper format, the simulation unit 34a-2 refers to the table 43a-2 to set a corresponding flag in the second storage unit 42a. Next, the simulation unit 34a-2 checks whether or not the value of the operand op2 for the divide instruction is 0. When the value of the operand op2 is 0, the simulation unit 34a-2 refers to the table 43a-2 to set a corresponding flag in the second storage unit 42a. Next, the simulation unit 34a-2 checks whether or not the operand op1 of the divide instruction may be stored. When the operand op1 may be stored, the simulation unit 34a-2 refers to the table 43a-2 to set a corresponding flag in the second storage unit 42a. The simulation unit 34a-2 then performs computational-operation simulation on the corresponding exception processing in accordance with the state of the set flag. Alternatively, the simulation unit 34a-2 performs computational-operation simulation on the divide instruction.

Figure 10:
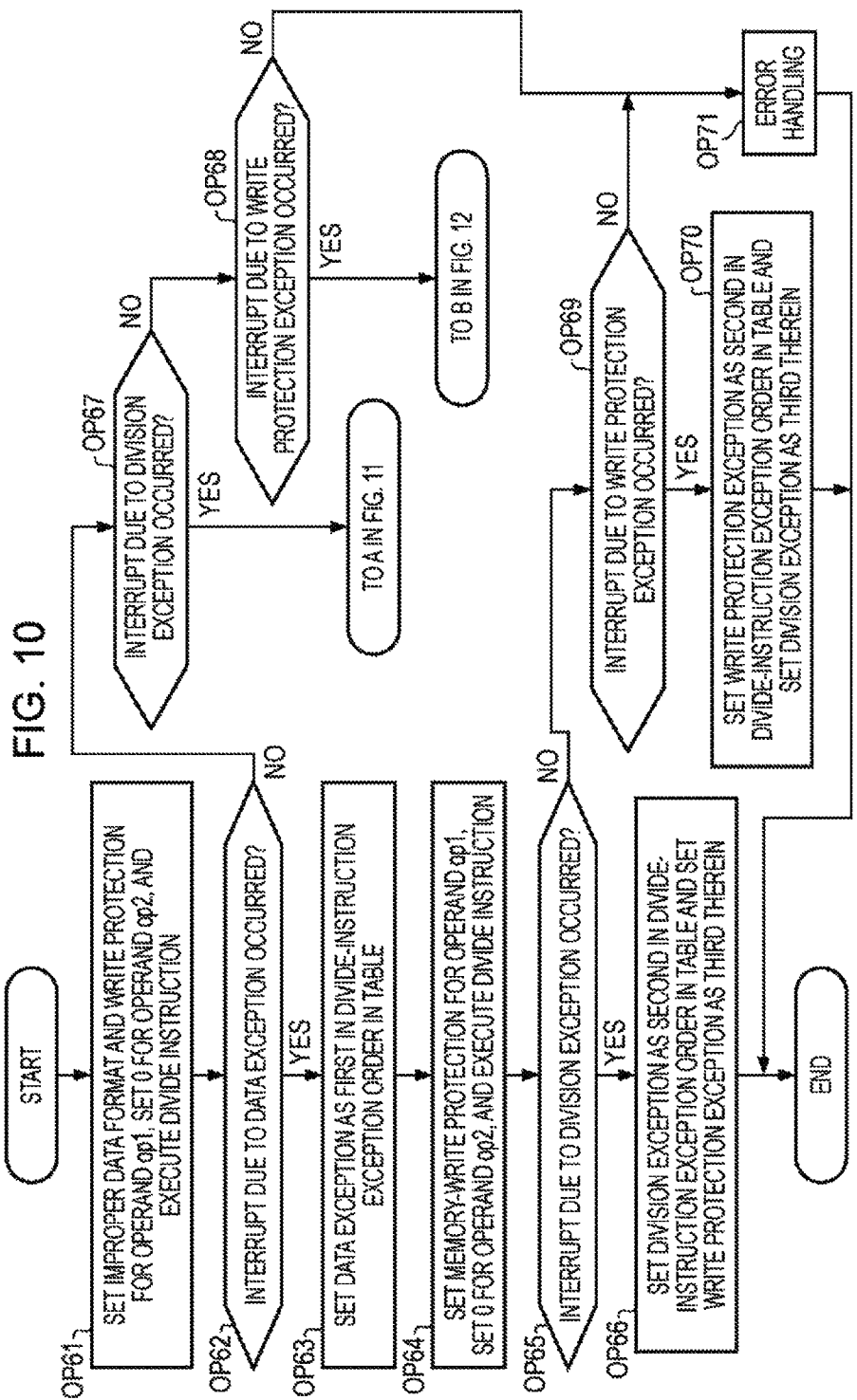
FIG. 10 is a flowchart of the operation of the processor testing apparatus according to the second embodiment.
Figure 11:
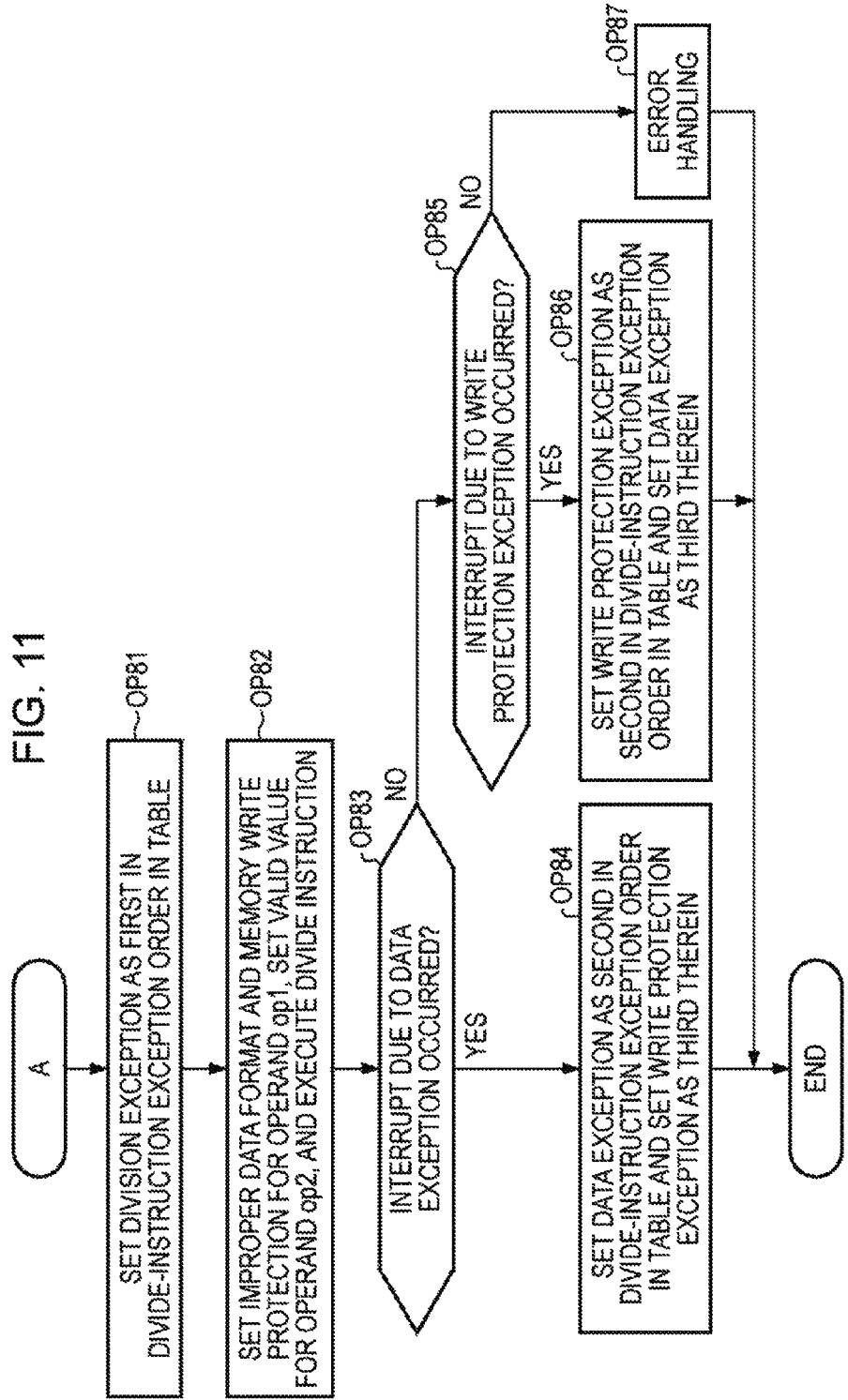
FIG. 11 is a flowchart of the operation of the processor testing apparatus according to the second embodiment.
Figure 12:
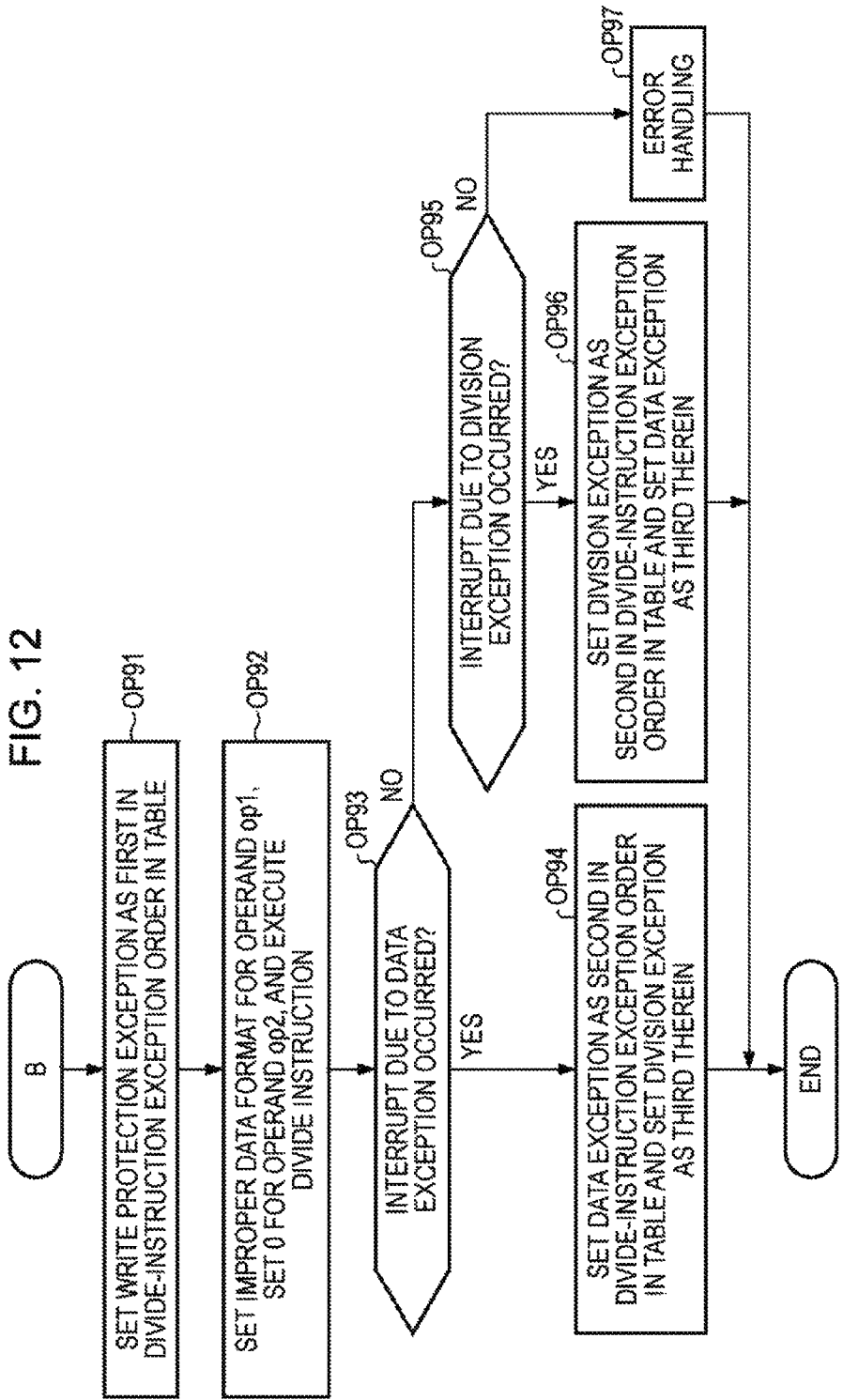
FIG. 12 is a flowchart of the operation of the processor testing apparatus according to the second embodiment.

FIGS. 10 to 12 are flowcharts illustrating operation pre-checking of the processor testing apparatus 20a according to the second embodiment. The processing operation illustrated in A in FIG. 10 is followed by A in FIG. 11. The processing operation illustrated in B in FIG. 10 is followed by B in FIG. 12. In FIGS. 10 to 12, elements that are substantially the same as those illustrated in FIGS. 1 to 6 in the first embodiment and those illustrated in FIG. 9 in the second embodiment are denoted by the same reference numerals, and descriptions thereof are not given hereinafter.

The flowcharts illustrated in FIGS. 10 to 12 have nine conditional-branching processing operations, i.e., operations OP62, OP65, OP69, OP67, OP83, OP85, OP68, OP93, and OP95. Depending on these conditional-branching operations, the flowchart illustrated in FIGS. 10 to 12 has the following combinations of processing operations.

Operation Pre-Checking Flow 1: YES in OP62 and YES in OP65

Operation Pre-Checking Flow 2: YES in OP62, NO in OP65, and YES in OP69

Operation Pre-Checking Flow 3: YES in OP62, NO in OP65, and NO in OP69

Operation Pre-Checking Flow 4: NO in OP62, YES in OP67, and YES in OP83

Operation Pre-Checking Flow 5: NO in OP62, YES in OP67, NO in OP83, and YES in OP85

Operation Pre-Checking Flow 6: NO in OP62, YES in OP67, NO in OP83, and NO in OP85

Operation Pre-Checking Flow 7: NO in OP62, NO in OP67, YES in OP68, and YES in OP93

Operation Pre-Checking Flow 8: NO in OP62, NO in OP67, YES in OP68, NO in OP93, and YES in OP95

Operation Pre-Checking Flow 9: NO in OP62, NO in OP67, YES in OP68, NO in OP93, and NO in OP95

Operation Pre-Checking Flow 10: NO in OP62, NO in OP67, and NO in OP68

The ten flows noted above will be described below with reference to FIGS. 10 to 12. In the second embodiment, the processor 12*a* executes the program 30*a* to allow the first processor 31*a* to the seventh processor 40*a* to perform operations, as in the first embodiment. In the following descriptions, a description for processing in which the first processing unit 31*a* issues processing instructions to the second processing unit 32*a* to the seventh processing unit 40*a* is omitted in order to avoid redundancy, as in the first embodiment.

In operation OP61, the pre-checking unit 36*a*-2 sets an improper data format and write protection for the operand op1, sets 0 for the operand op2, and executes a divide instruction. In operation OP62, the pre-checking unit 36*a*-2 determines whether or not an interrupt due to a data exception occurred.

In the case of the operation pre-checking flow 1, since an interrupt due to a data exception occurs (YES in operation OP62), the process proceeds to operation OP63 in which the pre-checking unit 36*a*-2 sets the data exception as the first in the divide-instruction exception order in the table 43*a*-2. In operation OP64, the pre-checking unit 36*a*-2 sets memory-write protection for the operand op1, sets 0 for the operand op2, and executes a divide instruction. In operation OP65, the pre-checking unit 36*a*-2 determines whether or not an interrupt due to a division exception occurred. In the case of the operation pre-checking flow 1, since an interrupt due to a division exception occurs (YES in operation OP65), the process proceeds to operation OP66 in which the fourth processing unit 37*a*-2 sets the division exception as the second in the divide-instruction exception order in the table 43*a*-2 and sets the write protection exception as the third therein.

In operation OP61, the pre-checking unit 36*a*-2 sets an improper data format and write protection for the operand op1, sets 0 for the operand op2, and executes a divide instruction. In operation OP62, the pre-checking unit 36*a*-2 determines whether or not an interrupt due to a data exception occurred.

In the case of the operation pre-checking flow 2, since an interrupt due to a data exception occurs (YES in operation OP62), the process proceeds to operation OP63 in which the pre-checking unit 36*a*-2 sets the data exception as the first in the divide-instruction exception order in the table 43*a*-2. In operation OP64, the pre-checking unit 36*a*-2 sets memory-write protection for the operand op1, sets 0 for the operand op2, and executes a divide instruction. In operation OP65, the pre-checking unit 36*a*-2 determines whether or not an interrupt due to a division exception occurred. In the case of the operation pre-checking flow 2, since an interrupt due to a division exception does not occur (NO in operation OP65), the process proceeds to operation OP69 in which the pre-checking unit 36*a*-2 determines whether or not an interrupt due to a write protection exception occurred. In the case of the operation pre-checking flow 2, since an interrupt due to a write protection exception occurs (YES in operation OP69), the process proceeds to operation OP70 in which the fourth processor 37*a*-2 sets the write protection exception as the second in the divide-instruction exception order in the table 43*a*-2 and sets the division exception as the third therein.

In operation OP61, the pre-checking unit 36*a*-2 sets an improper data format and write protection for the operand op1, sets 0 for the operand op2, and executes a divide instruction. In operation OP62, the pre-checking unit 36*a*-2 determines whether or not an interrupt due to a data exception occurred.

In the case of the operation pre-checking flow 3, since an interrupt due to a data exception occurs (YES in operation OP62), the process proceeds to operation OP63 in which the pre-checking unit 36*a*-2 sets the data exception as the first in the divide-instruction exception order in the table 43*a*-2. In operation OP64, the pre-checking unit 36*a*-2 sets memory-write protection for the operand op1, sets 0 for the operand op2, and executes a divide instruction. In operation OP65, the pre-checking unit 36*a*-2 determines whether or not an interrupt due to a division exception occurred. In the case of the operation pre-checking flow 3, since an interrupt due to a division exception does not occur (NO in operation OP65), the process proceeds to operation OP69 in which the pre-checking unit 36*a*-2 determines whether or not an interrupt due to a write protection exception occurred. In the case of the operation pre-checking flow 3, since an interrupt due to a write protection exception does not occur (NO in operation OP69), the process proceeds to operation OP71 in which the seventh processing unit 40*a* performs error handling, for example, for outputting an error log to the output device 23*a*.

In operation OP61, the pre-checking unit 36*a*-2 sets an improper data format and write protection for the operand op1, sets 0 for the operand op2, and executes a divide instruction. In operation OP62, the pre-checking unit 36*a*-2 determines whether or not an interrupt due to a data exception occurred.

In the case of the operation pre-checking flow 4, since an interrupt due to a data exception does not occur (NO in operation OP62), the process proceeds to operation OP67 in which the pre-checking unit 36*a*-2 determines whether or not an interrupt due to a division exception occurred. In the case of the operation pre-checking flow 4, since an interrupt due to a division exception occurs (YES in operation OP67), the process proceeds to operation OP81 in which the pre-checking unit 36*a*-2 sets the division exception as the first in the divide-instruction exception order in the table 43*a*-2. In operation OP82, the pre-checking unit 36*a*-2 sets an improper data format and memory write protection for the operand op1, sets a valid value for the operand op2, and executes a divide instruction. In operation OP83, the pre-checking unit 36*a*-2 determines whether or not an interrupt due to a data exception occurred. In the case of the operation pre-checking flow 4, since an interrupt due to a data exception occurs (YES in operation OP83), the process proceeds to operation OP84 in which the fourth processing unit 37*a*-2 sets the data exception as the second in the divide-instruction exception order in the table 43*a*-2 and sets the write protection exception as the third therein.

In operation OP61, the pre-checking unit 36*a*-2 sets an improper data format and write protection for the operand op1, sets 0 for the operand op2, and executes a divide instruction. In operation OP62, the pre-checking unit 36*a*-2 determines whether or not an interrupt due to a data exception occurred.

In the case of the operation pre-checking flow 5, since an interrupt due to a data exception does not occur (NO in operation OP62), the process proceeds to operation OP67 in which the pre-checking unit 36a-2 determines whether or not an interrupt due to a division exception occurred. In the case of the operation pre-checking flow 5, since an interrupt due to a division exception occurs (YES in operation OP67), the process proceeds to operation OP81 in which the pre-checking unit 36a-2 sets the division exception as the first in the divide-instruction exception order in the table 43a-2. In operation OP82, the pre-checking unit 36a-2 sets an improper data format and memory write protection for the operand op1, sets a valid value for the operand op2, and executes a divide instruction. In operation OP83, the pre-checking unit 36a-2 determines whether or not an interrupt due to a data exception occurred. In the case of the operation pre-checking flow 5, since an interrupt due to a data exception does not occur (NO in operation OP83), the process proceeds to operation OP85 in which the pre-checking unit 36a-2 determines whether or not an interrupt due to a write protection exception occurred. In the case of the operation pre-checking flow 5, since an interrupt due to a write protection exception occurs (YES in operation OP85), the process proceeds to operation OP86 in which the fourth processing unit 37a-2 sets the write protection exception as the second in the divide-instruction exception order in the table 43a-2 and sets the data exception as the third therein.

In operation OP61, the pre-checking unit 36a-2 sets an improper data format and write protection for the operand op1, sets 0 for the operand op2, and executes a divide instruction. In operation OP62, the pre-checking unit 36a-2 determines whether or not an interrupt due to a data exception occurred.

In the case of the operation pre-checking flow 6, since an interrupt due to a data exception does not occur (NO in operation OP62), the process proceeds to operation OP67 in which the pre-checking unit 36a-2 determines whether or not an interrupt due to a division exception occurred. In the case of the operation pre-checking flow 6, since an interrupt due to a division exception occurs (YES in operation OP67), the process proceeds to operation OP81 in which the pre-checking unit 36a-2 sets the division exception as the first in the divide-instruction exception order in the table 43a-2. In operation OP82, the pre-checking unit 36a-2 sets an improper data format and memory write protection for the operand op1, sets a valid value for the operand op2, and executes a divide instruction. In operation OP83, the pre-checking unit 36a-2 determines whether or not an interrupt due to a data exception occurred. In the case of the operation pre-checking flow 6, since an interrupt due to a data exception does not occur (NO in operation OP83), the process proceeds to operation OP85 in which the pre-checking unit 36a-2 determines whether or not an interrupt due to a write protection exception occurred. In the case of the operation pre-checking flow 6, since an interrupt due to a write protection exception does not occur (NO in operation OP85), the process proceeds to operation OP87 in which the seventh processing unit 40a performs error handling, for example, for outputting an error log to the output device 23a.

In operation OP61, the pre-checking unit 36a-2 sets an improper data format and write protection for the operand op1, sets 0 for the operand op2, and executes a divide instruction. In operation OP62, the pre-checking unit 36a-2 determines whether or not an interrupt due to a data exception occurred.

In the case of the operation pre-checking flow 7, since an interrupt due to a data exception does not occur (NO in operation OP62), the process proceeds to operation OP67 in which the pre-checking unit 36a-2 determines whether or not an interrupt due to a division exception occurred. In the case of the operation pre-checking flow 7, since an interrupt due to a division exception does not occur (NO in operation OP67), the process proceeds to operation OP68 in which the pre-checking unit 36a-2 determines whether or not an interrupt due to a write protection exception occurred. In the case of the operation pre-checking flow 7, since an interrupt due to a write protection exception occurs (YES in operation OP68), the process proceeds to operation OP91 in which the pre-checking unit 36a-2 sets the write protection exception as the first in the divide-instruction exception order in the table 43a-2. In operation OP92, the pre-checking unit 36a-2 sets an improper data format for the operand op1, sets 0 for the operand op2, and executes a divide instruction. In operation OP93, the pre-checking unit 36a-2 determines whether or not an interrupt due to a data exception occurred. In the case of the operation pre-checking flow 7, since an interrupt due to a data exception occurs (YES in operation OP93), the process proceeds to operation OP94 in which the fourth processing unit 37a-2 sets the data exception as the second in the divide-instruction exception order in the table 43a-2 and sets the division exception as the third therein.

In operation OP61, the pre-checking unit 36a-2 sets an improper data format and write protection for the operand op1, sets 0 for the operand op2, and executes a divide instruction. In operation OP62, the pre-checking unit 36a-2 determines whether or not an interrupt due to a data exception occurred.

In the case of the operation pre-checking flow 8, since an interrupt due to a data exception does not occur (NO in operation OP62), the process proceeds to operation OP67 in which the pre-checking unit 36a-2 determines whether or not an interrupt due to a division exception occurred. In the case of the operation pre-checking flow 8, since an interrupt due to a division exception does not occur (NO in operation OP67), the process proceeds to operation OP68 in which the pre-checking unit 36a-2 determines whether or not an interrupt due to a write protection exception occurred. In the case of the operation pre-checking flow 8, since an interrupt due to a write protection occurs (YES in operation OP68), the process proceeds to operation OP91 in which the pre-checking unit 36a-2 sets the write protection exception as the first in the divide-instruction exception order in the table 43a-2. In operation OP92, the pre-checking unit 36a-2 sets an improper data format for the operand op1, sets 0 for the operand op2, and executes a divide instruction. In operation OP93, the pre-checking unit 36a-2 determines whether or not an interrupt due to a data exception occurred. In the case of the operation pre-checking flow 8, since an interrupt due to a data exception does not occur (NO in operation OP93), the process proceeds to operation OP95 in which the pre-checking unit 36a-2 determines whether or not an interrupt due to a division exception occurred. In the case of the operation pre-checking flow 8, since an interrupt due to a division exception occurs (YES in operation OP95), the process proceeds to operation OP96 in which the fourth processing unit 37a-2 sets the division exception as the second in the divide-instruction exception order in the table 43a-2 and sets the data exception as the third therein.

In operation OP61, the pre-checking unit 36a-2 sets an improper data format and write protection for the operand op1, sets 0 for the operand op2, and executes a divide instruction. In operation OP62, the pre-checking unit 36a-2 determines whether or not an interrupt due to a data exception occurred.

In the case of the operation pre-checking flow 9, since an interrupt due to a data exception does not occur (NO in operation OP62), the process proceeds to operation OP67 in which the pre-checking unit 36a-2 determines whether or not an interrupt due to a division exception occurred. In the case of the operation pre-checking flow 9, since an interrupt due to a division exception does not occur (NO in operation OP67), the process proceeds to operation OP68 in which the pre-checking unit 36a-2 determines whether or not an interrupt due to a write protection exception occurred. In the case of the operation pre-checking flow 9, since an interrupt due to a write protection exception occurs (YES in operation OP68), the process proceeds to operation OP91 in which the pre-checking unit 36a-2 sets the write protection exception as the first in the divide-instruction exception order in the table 43a-2. In operation OP92, the pre-checking unit 36a-2 sets an improper data format for the operand op1, sets 0 for the operand op2, and executes a divide instruction. In operation OP93, the pre-checking unit 36a-2 determines whether or not an interrupt due to a data exception occurred. In the case of the operation pre-checking flow 9, since an interrupt due to a data exception does not occur (NO in operation OP93), the process proceeds to operation OP95 in which the pre-checking unit 36a-2 determines whether or not an interrupt due to a division exception occurred. In the case of the operation pre-checking flow 9, since an interrupt due to a division exception does not occur (NO in operation OP95), the process proceeds to operation OP97 in which the seventh processing unit 40a performs error handling, for example, for outputting an error log to the output device 23a.

In operation OP61, the pre-checking unit 36a-2 sets an improper data format and write protection for the operand op1, sets 0 for the operand op2, and executes a divide instruction. In operation OP62, the pre-checking unit 36a-2 determines whether or not an interrupt due to a data exception occurred.

In the case of the operation pre-checking flow 10, since an interrupt due to a data exception does not occur (NO in operation OP62), the process proceeds to operation OP67 in which the pre-checking unit 36a-2 determines whether or not an interrupt due to a division exception occurred. In the case of the operation pre-checking flow 10, since an interrupt due to a division exception does not occur (NO in operation OP67), the process proceeds to operation OP68 in which the pre-checking unit 36a-2 determines whether or not an interrupt due to a write protection exception occurred. In the case of the operation pre-checking flow 10, since an interrupt due to a write protection exception does not occur (NO in operation OP68), the process proceeds to operation OP71 in which the seventh processing unit 40a performs error handling, for example, for outputting an error log to the output device 23a.

Figure 13:
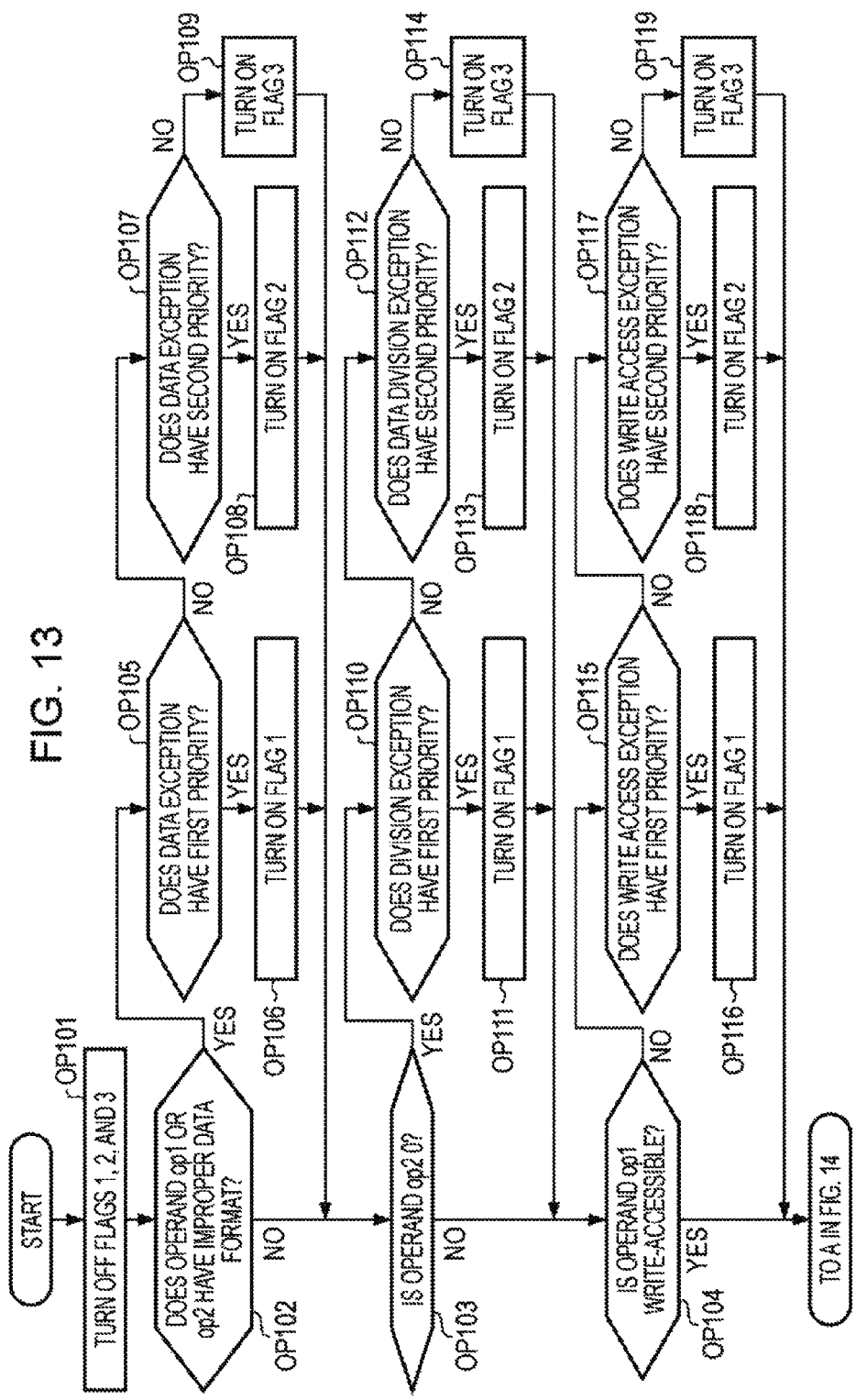
FIG. 13 is a flowchart of the operation of the processor testing apparatus according to the second embodiment.
Figure 14:
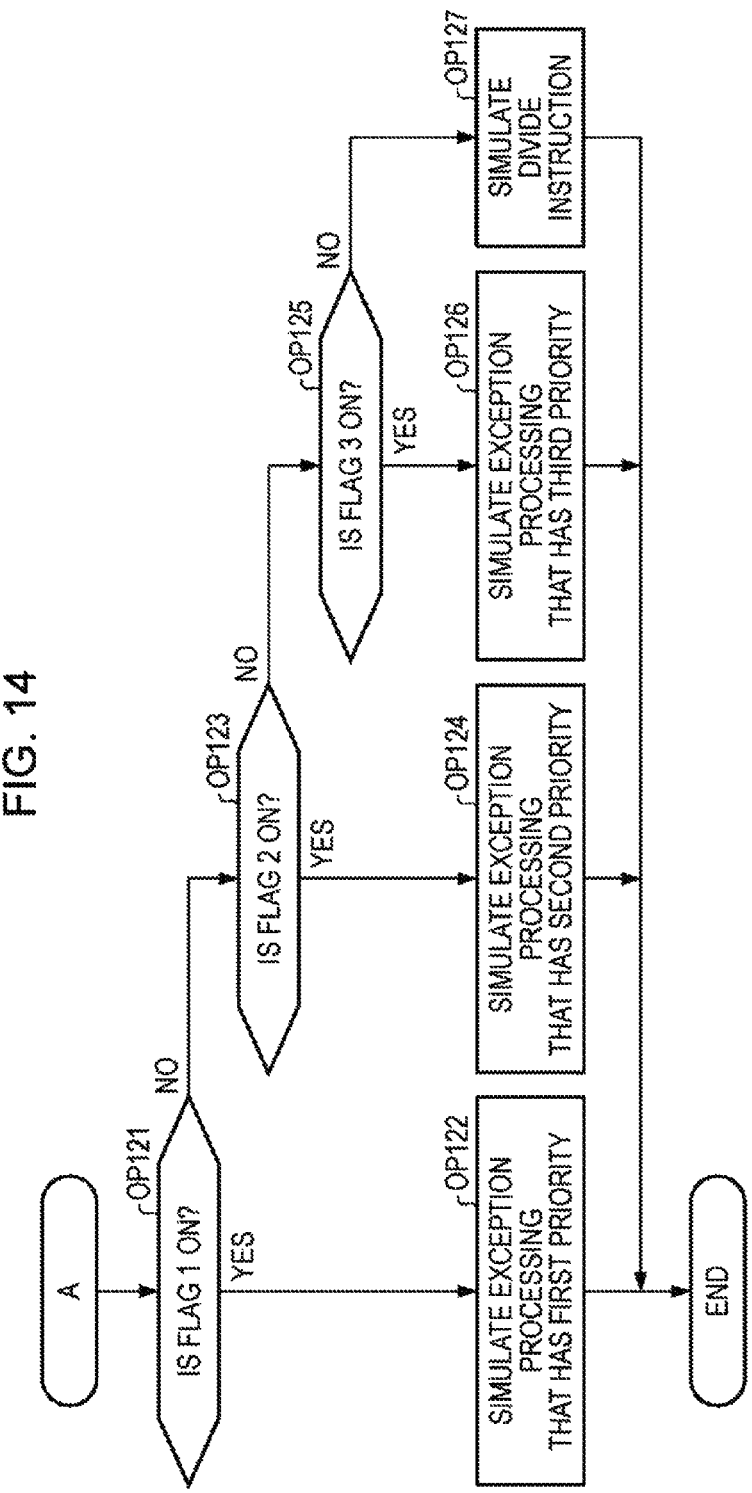
FIG. 14 is a flowchart of the operation of the processor testing apparatus according to the second embodiment.

FIGS. 13 to 14 are flowcharts illustrating an instruction simulation operation of the processor testing apparatus 20a according to the second embodiment. The processing operation illustrated in A in FIG. 13 is followed by A in FIG. 14. In FIGS. 13 and 14, elements that are substantially the same as those illustrated in FIG. 8 in the first embodiment and those illustrated in FIGS. 9 to 12 in the second embodiment are denoted by the same reference numerals, and descriptions thereof are not given hereinafter.

The flowcharts illustrated in FIGS. 13 and 14 have twelve conditional-branching processing operations, i.e., operations OP102, OP105, OP107, OP103, OP110, OP112, OP104, OP115, OP117, OP121, OP123, and OP125. Depending on these conditional-branching operations, the flowcharts illustrated in FIGS. 13 and 14 have the following combinations of processing operations.

Instruction Simulation Operation Flow 1: YES in OP102, YES in OP105, NO in OP103, YES in OP104, and YES in OP121

Instruction Simulation Operation Flow 2: YES in OP102, NO in OP105, YES in OP107, NO in OP103, YES in OP104, NO in OP121, and YES in OP123

Instruction Simulation Operation Flow 3: YES in OP102, NO in OP105, NO in OP107, NO in OP103, YES in OP104, NO in OP121, NO in OP123, and YES in OP125

Instruction Simulation Operation Flow 4: NO in OP102, YES in OP103, YES in OP110, YES in OP104, and YES in OP121

Instruction Simulation Operation Flow 5: NO in OP102, YES in OP103, NO in OP110, YES in OP112, YES in OP104, NO in OP121, and YES in OP123

Instruction Simulation Operation Flow 6: NO in OP102, YES in OP103, NO in OP110, NO in OP112, YES in OP104, NO in OP121, NO in OP123, and YES in OP125

Instruction Simulation Operation Flow 7: NO in OP102, NO in OP103, NO in OP104, YES in OP115, and YES in OP121

Instruction Simulation Operation Flow 8: NO in OP102, NO in OP103, NO in OP104, NO in OP115, YES in OP117, NO in OP121, and YES in OP123

Instruction Simulation Operation Flow 9: NO in OP102, NO in OP103, NO in OP104, NO in OP115, NO in OP117, NO in OP121, NO in OP123, and YES in OP125

Instruction Simulation Operation Flow 10: NO in OP102, NO in OP103, YES in OP104, NO in OP121, NO in OP123, and NO in OP125

The ten flows noted above will be described below with reference to FIGS. 13 to 14. In the following descriptions given with reference to FIGS. 13 and 14, a description for processing in which the first processing unit 31a issues processing instructions to the second processing unit 32a to the seventh processing unit 40a is omitted in order to avoid redundancy, as in FIGS. 11 and 12.

In operation OP101, the simulation unit 34a-2 turns off the flag 1, the flag 2, and the flag 3 set in the primary storage device 11a. In operation OP102, the simulation unit 34a-2 determines whether or not the operand op1 or op2 stored in the first storage unit 41a-2 has an improper data format.

In the case of the instruction simulation operation flow 1, since the operand op1 or op2 stored in the first storage unit 41a-2 has an improper data format (YES in operation OP102), the process proceeds to operation OP105 in which the simulation unit 34a-2 determines whether or not the data exception for the operand op1 or op2 has first priority. In the case of the instruction simulation operation flow 1, since the data exception for the operand op1 or op2 has first priority (YES in operation OP105), the process proceeds to operation OP106 in which the simulation unit 34a-2 refers to the table 43a-2 to turn on the operation flag 1 indicating that the data exception for the operand op1 or op2 has first priority.

In operation OP103, the simulation unit 34a-2 determines whether or not the operand op2 stored in the first storage unit 41a-2 is 0. In the case of the instruction simulation operation flow 1, since the operand op2 is not 0 (NO in operation OP103), the process proceeds to operation OP104 in which the simulation unit 34a-2 determines whether or not the operand op1 is write-accessible. In the case of the instruction simulation operation flow 1, since the operand op1 is write-accessible (YES in operation OP104), the process proceeds to operation OP121 in which the simulation unit 34a-2 determines whether or not the operation flag 1 indicating that the data exception for the operand op1 or op2 has first priority is on. In the case of the instruction simulation operation flow 1, since the operation flag 1 is on (YES in operation OP121), the process proceeds to operation OP122 in which the simulation unit 34a-2 simulates the data exception processing that has first priority.

In operation OP101, the simulation unit 34a-2 turns off the flag 1, the flag 2, and the flag 3 set in the primary storage device 11a. In operation OP102, the simulation unit 34a-2 determines whether or not the operand op1 or op2 stored in the first storage unit 41a-2 has an improper data format.

In the case of the instruction simulation operation flow 2, since the operand op1 or op2 stored in the first storage unit 41a-2 has an improper data format (YES in operation OP102), the process proceeds to operation OP105 in which the simulation unit 34a-2 determines whether or not the data exception for the operand op1 or op2 has first priority. In the case of the instruction simulation operation flow 2, since the data exception for the operand op1 or op2 does not have first priority (NO in operation OP105), the process proceeds to operation OP107 in which the simulation unit 34a-2 determines whether or not the data exception for the operand op1 or op2 has second priority. In the case of the instruction simulation operation flow 2, since the data exception for the operand op1 or op2 has second priority (YES in operation OP107), the process proceeds to operation OP108 in which the simulation unit 34a-2 refers to the table 43a-2 to turn on the operation flag 2 indicating that the data exception for the operand op1 or op2 has second priority.

In operation OP103, the simulation unit 34a-2 determines whether or not the operand op2 stored in the first storage unit 41a-2 is 0. In the case of the instruction simulation operation flow 2, since the operand op2 is not 0 (NO in operation OP103), the process proceeds to operation OP104 in which the simulation unit 34a-2 determines whether or not the operand op1 is write-accessible. In the case of the instruction simulation operation flow 2, since the operand op1 is write-accessible (YES in operation OP104), the process proceeds to operation OP121 in which the simulation unit 34a-2 determines whether or not the operation flag 1 indicating that the data exception for the operand op1 or op2 has first priority is on. In the case of the instruction simulation operation flow 2, since the operation flag 1 is not on (NO in operation OP121), the process proceeds to operation OP123 in which the simulation unit 34a-2 determines whether or not the operation flag 2 indicating that the data exception for the operand op1 or op2 has second priority is on. In the case of the instruction simulation operation flow 2, since the operation flag 2 is on (YES in operation OP123), the process proceeds to operation OP124 in which the simulation unit 34a-2 simulates the data exception processing that has second priority.

In operation OP101, the simulation unit 34a-2 turns off the flag 1, the flag 2, and the flag 3 set in the primary storage device 11a. In operation OP102, the simulation unit 34a-2 determines whether or not the operand op1 or op2 stored in the first storage unit 41a-2 has an improper data format.

In the case of the instruction simulation operation flow 3, since the operand op1 or op2 stored in the first storage unit 41a-2 has an improper data format (YES in operation OP102), the process proceeds to operation OP105 in which the simulation unit 34a-2 determines whether or not the data exception for the operand op1 or op2 has first priority. In the case of the instruction simulation operation flow 3, since the data exception for the operand op1 or op2 does not have first priority (NO in operation OP105), the process proceeds to operation OP107 in which the simulation unit 34a-2 determines whether or not the data exception for the operand op1 or op2 has second priority. In the case of the instruction simulation operation flow 3, since the data exception for the operand op1 or op2 does not have second priority (NO in operation OP107), the process proceeds to operation OP109 in which the simulation unit 34a-2 refers to the table 43a-2 to turn on the operation flag 3 indicating that the data exception for the operand op1 or op2 has third priority.

In operation OP103, the simulation unit 34a-2 determines whether or not the operand op2 stored in the first storage unit 41a-2 is 0. In the case of the instruction simulation operation flow 3, since the operand op2 is not 0 (NO in operation OP103), the process proceeds to operation OP104 in which the simulation unit 34a-2 determines whether or not the operand op1 is write-accessible. In the case of the instruction simulation operation flow 3, since the operand op1 is write-accessible (YES in operation OP104), the process proceeds to operation OP121 in which the simulation unit 34a-2 determines whether or not the operation flag 1 indicating that the data exception for the operand op1 or op2 has first priority is on. In the case of the instruction simulation operation flow 3, since the operation flag 1 is not on (NO in operation OP121), the process proceeds to operation OP123 in which the simulation unit 34a-2 determines whether or not the operation flag 2 indicating that the data exception for the operand op1 or op2 has second priority is on. In the case of the instruction simulation operation flow 3, since the operation flag 2 is not on (NO in operation OP123), the process proceeds to operation OP125 in which the simulation unit 34a-2 determines whether or not the operation flag 3 is on. In the case of the instruction simulation operation flow 3, since the operation flag 3 indicating that the data exception for the operand op1 or op2 has third priority is on (YES in operation OP125), the process proceeds to operation OP126 in which the simulation unit 34a-2 simulates the data exception processing that has third priority.

In operation OP101, the simulation unit 34a-2 turns off the flag 1, the flag 2, and the flag 3 set in the primary storage device 11a. In operation OP102, the simulation unit 34a-2 determines whether or not the operand op1 or op2 stored in the first storage unit 41a-2 has an improper data format.

In the case of the instruction simulation operation flow 4, since the operand op1 or op2 does not have an improper data format (NO in operation OP102), the process proceeds to operation OP103 in which the simulation unit 34a-2 determines whether or not the operand op2 stored in the first storage unit 41a-2 is 0. In the case of the instruction simulation operation flow 4, since the operand op2 is 0 (YES in operation OP103), the process proceeds to operation OP110 in which the simulation unit 34a-2 determines whether or not the division exception has first priority. In the case of the instruction simulation operation flow 4, since the division exception has first priority (YES in operation OP110), the process proceeds to operation OP111 in which the simulation unit 34a-2 refers to the table 43a-2 to turn on the operation flag 1 indicating that the division exception has first priority.

In operation OP104, the simulation unit 34a-2 determines whether or not the operand op1 is write-accessible. In the case of the instruction simulation operation flow 4, since the operand op1 is write-accessible (YES in operation OP104), the process proceeds to operation OP121 in which the simulation unit 34a-2 determines whether or not the operation flag 1 indicating that the division exception has first priority is on. In the case of the instruction simulation operation flow 4, since the operation flag 1 is on (YES in operation OP121), the process proceeds to operation OP122 in which the simulation unit 34a-2 simulates the division exception processing that has first priority.

In operation OP101, the simulation unit 34a-2 turns off the flag 1, the flag 2, and the flag 3 set in the primary storage device 11a. In operation OP102, the simulation unit 34a-2 determines whether or not the operand op1 or op2 stored in the first storage unit 41a-2 has an improper data format.

In the case of the instruction simulation operation flow 5, since the operand op1 or op2 does not have an improper data format (NO in operation OP102), the process proceeds to operation OP103 in which the simulation unit 34a-2 determines whether or not the operand op2 stored in the first storage unit 41a-2 is 0. In the case of the instruction simulation operation flow 5, since the operand op2 is 0 (YES in operation OP103), the process proceeds to operation OP110 in which the simulation unit 34a-2 determines whether or not the division exception has first priority. In the case of the instruction simulation operation flow 5, since the division exception does not have first priority (NO in operation OP110), the process proceeds to operation OP112 in which the simulation unit 34a-2 determines whether or not the division exception has second priority. In the case of the instruction simulation operation flow 5, since the division exception has second priority (YES in operation OP112), the process proceeds to operation OP113 in which the simulation unit 34a-2 refers to the table 43a-2 to turn on the operation flag 2 indicating that the division exception has second priority.

In operation OP104, the simulation unit 34a-2 determines whether or not the operand op1 is write-accessible. In the case of the instruction simulation operation flow 5, since the operand op1 is write-accessible (YES in operation OP104), the process proceeds to operation OP121 in which the simulation unit 34a-2 determines whether or not the operation flag 1 indicating that the division exception has first priority is on. In the case of the instruction simulation operation flow 5, since the operation flag 1 is not on (NO in operation OP121), the process proceeds to operation OP123 in which the simulation unit 34a-2 determines whether or not the operation flag 2 indicating that the division exception has second priority is on. In the case of the instruction simulation operation flow 5, since the operation flag 2 is on (YES in operation OP123), the process proceeds to operation OP124 in which the simulation unit 34a-2 simulates the division exception processing that has second priority.

In operation OP101, the simulation unit 34a-2 turns off the flag 1, the flag 2, and the flag 3 set in the primary storage device 11a. In operation OP102, the simulation unit 34a-2 determines whether or not the operand op1 or op2 stored in the first storage unit 41a-2 has an improper data format.

In the case of the instruction simulation operation flow 6, since the operand op1 or op2 does not have an improper data format (NO in operation OP102), the process proceeds to operation OP103 in which the simulation unit 34a-2 determines whether or not the operand op2 stored in the first storage unit 41a-2 is 0. In the case of the instruction simulation operation flow 6, since the operand op2 is 0 (YES in operation OP103), the process proceeds to operation OP110 in which the simulation unit 34a-2 determines whether or not the division exception has first priority. In the case of the instruction simulation operation flow 6, since the division exception does not have first priority (NO in operation OP110), the process proceeds to operation OP112 in which the simulation unit 34a-2 determines whether or not the division exception has second priority. In the case of the instruction simulation operation flow 6, since the division exception does not have second priority (NO in operation OP112), the process proceeds to operation OP114 in which the simulation unit 34a-2 refers to the table 43a-2 to turn on the operation flag 3 indicating that the division exception has third priority.

In operation OP104, the simulation unit 34a-2 determines whether or not the operand op1 is write-accessible. In the case of the instruction simulation operation flow 6, since the operand op1 is write-accessible (YES in operation OP104), the process proceeds to operation OP121 in which the simulation unit 34a-2 determines whether or not the operation flag 1 indicating that the division exception has first priority is on. In the case of the instruction simulation operation flow 6, since the operation flag 1 is not on (NO in operation OP121), the process proceeds to operation OP123 in which the simulation unit 34a-2 determines whether or not the operation flag 2 indicating that the division exception has second priority is on. In the case of the instruction simulation operation flow 6, since the operation flag 2 is not on (NO in operation OP123), the process proceeds to operation OP125 in which the simulation unit 34a-2 determines whether or not the operation flag 3 indicating that the division exception has third priority is on. In the case of the instruction simulation operation flow 6, since the operation flag 3 is on (YES in operation OP125), the process proceeds to operation OP126 in which the simulation unit 34a-2 simulates the division exception processing that has third priority.

In operation OP101, the simulation unit 34a-2 turns off the flag 1, the flag 2, and the flag 3 set in the primary storage device 11a. In operation OP102, the simulation unit 34a-2 determines whether or not the operand op1 or op2 stored in the first storage unit 41a-2 has an improper data format.

In the case of the instruction simulation operation flow 7, since the operand op1 or op2 does not have an improper data format (NO in operation OP102), the process proceeds to operation OP103 in which the simulation unit 34a-2 determines whether or not the operand op2 stored in the first storage unit 41a-2 is 0. In the case of the instruction simulation operation flow 7, since the operand op2 is not 0 (NO in operation OP103), the process proceeds to operation OP104 in which the simulation unit 34a-2 determines whether or not the operand op1 is write-accessible.

In the case of the instruction simulation operation flow 7, since the operand op1 is not write-accessible (NO in operation OP104), the process proceeds to operation OP115 in which the simulation unit 34a-2 determines whether or not the write access exception has first priority. In the case of the instruction simulation operation flow 7, since the write access exception has first priority (YES in operation OP115), the process proceeds to operation OP116 in which the simulation unit 34a-2 refers to the table 43a-2 to turn on the operation flag 1 indicating that the write access exception has first priority.

In operation OP121, the simulation unit 34a-2 determines whether or not the operation flag 1 indicating that the write access exception has first priority is on. In the case of the instruction simulation operation flow 7, since the operation flag 1 is on (YES in operation OP121), the process proceeds to operation OP122 in which the simulation unit 34a-2 simulates the write access exception processing that has first priority.

In operation OP101, the simulation unit 34a-2 turns off the flag 1, the flag 2, and the flag 3 set in the primary storage device 11a. In operation OP102, the simulation unit 34a-2 determines whether or not the operand op1 or op2 stored in the first storage unit 41a-2 has an improper data format.

In the case of the instruction simulation operation flow 8, since the operand op1 or op2 does not have an improper data format (NO in operation OP102), the process proceeds to operation OP103 in which the simulation unit 34a-2 determines whether or not the operand op2 stored in the first storage unit 41a-2 is 0. In the case of the instruction simulation operation flow 8, since the operand op2 is not 0 (NO in operation OP103), the process proceeds to operation OP104 in which the simulation unit 34a-2 determines whether or not the operand op1 is write-accessible.

In the case of the instruction simulation operation flow 8, since the operand op1 is not write-accessible (NO in operation OP104), the process proceeds to operation OP115 in which the simulation unit 34a-2 determines whether or not the write access exception has first priority. In the case of the instruction simulation operation flow 8, since the write access exception does not have first priority (NO in operation OP115), the process proceeds to operation OP117 in which the simulation unit 34a-2 determines whether or not the write access exception has second priority. In the case of the instruction simulation operation flow 8, since the write access exception has second priority (YES in operation OP117), the process proceeds to operation OP118 in which the simulation unit 34a-2 refers to the table 43a-2 to turn on the operation flag 2 indicating that the write access exception has second priority.

In operation OP121, the simulation unit 34a-2 determines whether or not the operation flag 1 indicating that the write access exception has first priority is on. In the case of the instruction simulation operation flow 8, since the operation flag 1 is not on (NO in operation OP121), the process proceeds to operation OP123 in which the simulation unit 34a-2 determines whether or not the operation flag 2 indicating that the write access exception has second priority is on. In the case of the instruction simulation operation flow 8, since the operation flag 2 is on (YES in operation OP123), the process proceeds to operation OP124 in which the simulation unit 34a-2 simulates the write access exception processing that has second priority.

In operation OP101, the simulation unit 34a-2 turns off the flag 1, the flag 2, and the flag 3 set in the primary storage device 11a. In operation OP102, the simulation unit 34a-2 determines whether or not the operand op1 or op2 stored in the first storage unit 41a-2 has an improper data format.

In the case of the instruction simulation operation flow 9, since the operand op1 or op2 does not have an improper data format (NO in operation OP102), the process proceeds to operation OP103 in which the simulation unit 34a-2 determines whether or not the operand op2 stored in the first storage unit 41a-2 is 0. In the case of the instruction simulation operation flow 9, since the operand op2 is not 0 (NO in operation OP103), the process proceeds to operation OP104 in which the simulation unit 34a-2 determines whether or not the operand op1 is write-accessible.

In the case of the instruction simulation operation flow 9, since the operand op1 is not write-accessible (NO in operation OP104), the process proceeds to operation OP115 in which the simulation unit 34a-2 determines whether or not the write access exception has first priority. In the case of the instruction simulation operation flow 9, since the write access exception does not have first priority (NO in operation OP115), the process proceeds to operation OP117 in which the simulation unit 34a-2 determines whether or not the write access exception has second priority. In the case of the instruction simulation operation flow 9, since the write access exception does not have second priority (NO in operation OP117), the process proceeds to operation OP119 in which the simulation unit 34a-2 refers to the table 43a-2 to turn on the operation flag 3 indicating that the write access exception has third priority.

In operation OP121, the simulation unit 34a-2 determines whether or not the operation flag 1 indicating that the write access exception has first priority is on. In the case of the instruction simulation operation flow 9, since the operation flag 1 is not on (NO in operation OP121), the process proceeds to operation OP123 in which the simulation unit 34a-2 determines whether or not the operation flag 2 indicating that the write access exception has second priority is on. In the case of the instruction simulation operation flow 9, since the operation flag 2 is not on (NO in operation OP123), the process proceeds to operation OP125 in which the simulation unit 34a-2 determines whether or not the operation flag 3 indicating that the write access exception has third priority is on. In the case of the instruction simulation operation flow 9, since the operation flag 3 is on (YES in operation OP125), the process proceeds to operation OP126 in which the simulation unit 34a-2 simulates the write access exception processing that has third priority.

In operation OP101, the simulation unit 34a-2 turns off the flag 1, the flag 2, and the flag 3 set in the primary storage device 11a. In operation OP102, the simulation unit 34a-2 determines whether or not the operand op1 or op2 stored in the first storage unit 41a-2 has an improper data format.

In the case of the instruction simulation operation flow 10, since the operand op1 or op2 does not have an improper data format (NO in operation OP102), the process proceeds to operation OP103 in which the simulation unit 34a-2 determines whether or not the operand op2 stored in the first storage unit 41a-2 is 0. In the case of the instruction simulation operation flow 10, since the operand op2 is not 0 (NO in operation OP103), the process proceeds to operation OP104 in which the simulation unit 34a-2 determines whether or not the operand op1 is write-accessible. In the case of the instruction simulation operation flow 10, since the operand op1 is write-accessible (YES in operation OP104), the process proceeds to operation OP121 in which the simulation unit 34a-2 determines whether or not the operation flag 1 indicating that any of the data exception, the division exception, and the write access exception of the operand op1 or op2 has first priority is on.

In the case of the instruction simulation operation flow 10, since the operation flag 1 is not on (NO in operation OP121), the process proceeds to operation OP123 in which the simulation unit 34a-2 determines whether or not the operation flag 2 indicating that any of the data exception, the division exception, and the write access exception of the operand op1 or op2 has second priority is on. In the case of the instruction simulation operation flow 10, since the operation flag 2 is not on (NO in operation OP123), the process proceeds to operation OP125 in which the simulation unit 34a-2 determines whether or not the operation flag 3 indicating that any of the data exception, the division exception, and the write access exception of the operand op1 or op2 has third priority is on. In the case of the instruction simulation operation flow 10, since the operation flag 3 is not on (NO in operation OP125), the process proceeds to operation OP127 in which the simulation unit 34a-2 simulates the divide instruction for the operand op1 and operand op2.

According to the technology disclosed in the second embodiment, the processor testing apparatus 20a according to the second embodiment may determine an expectation value resulting from the simulation pre-considering the divide-instruction exception order as a model-dependent operation. Thus, since the expectation value is used to verify the operation of the processor 12b, no complicated process is desirable and the operation of the processor 12b may be verified efficiently. In addition, since the operation verification may be executed independently of the model-dependent operations, the accuracy of the operation verification of the processor 12b may be improved.

A third embodiment will be described below with reference to FIGS. 15 to 17.

Figure 15:
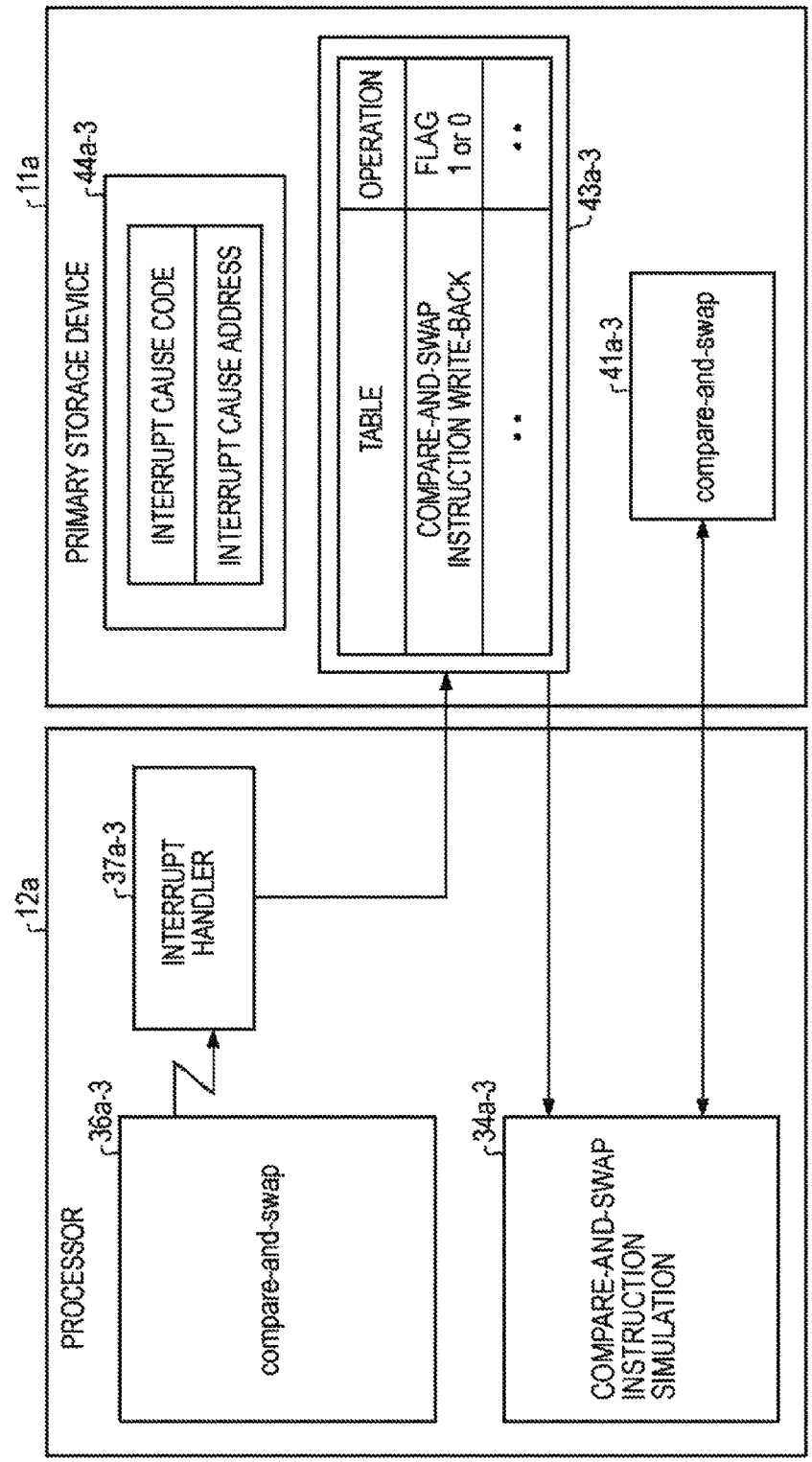
FIG. 15 is a diagram illustrating processing of a processor testing apparatus according to a third embodiment.

FIG. 15 is a diagram illustrating processing of a processor testing apparatus 20a according to a third embodiment. In the diagram of FIG. 15 illustrating processing of the processor testing apparatus 20a, elements that are substantially the same as those illustrated in FIGS. 1 to 6 in the first embodiment and those illustrated in FIG. 9 in the second embodiment are denoted by the same reference characters, and descriptions thereof are not given hereinafter. The model-dependent operation of the processor 12a in the third embodiment is a compare-and-swap write-back described below.

In FIG. 15, with respect to the compare-and-swap instruction for an exclusive control system between multiple processors, a pre-checking unit 36a-3 checks whether or not write-back to the primary storage device 11a is to be performed when the data stored in the primary storage device 11a serving as a memory and replacement data are the same. The compare-and-swap instruction in the third embodiment is to compare the data stored at a specific address in the primary storage device 11a used as a shared memory for multiple processors with replacement data stored in the register 12a-2 in the processor 12a. In this exclusive control system, when a result of the comparison indicates that the data are the same, the data stored at a specific address is replaced with the replacement data stored in the register 12a-2 in the processor 12a and the primary storage device 11a is accessed.

For example, for a compare-and-swap that is an exclusive control instruction between multiple processors, the pre-checking unit 36a-3 checks whether or not write-back to the memory is to be performed when the data stored in the primary storage device 11a and the replacement data are the same. The pre-checking unit 36a-3 sets a write protection condition for, in the primary storage device 11a, an address to be accessed by the compare-and-swap and executes an instruction regarding that the stored data and the replacement data have the same value.

The fourth processing unit 37a-3 sets a write protection condition for, in the primary storage device 11a, an address to be accessed by the compare-and-swap and executes an instruction regarding that the stored data and the replacement data have the same value. After the compare-and-swap instruction is executed on the data stored in a first storage unit 41a-3, the interrupt handler checks whether or not an interrupt due to a write protection condition occurred. The first processing unit 31a causes a fourth processing unit 37a-3 to add the launched interrupt handler as an instruction subsequent to the test instruction sequence stored in the first storage unit 41a-3.

At the same time the interrupt handler is launched, the processor 12a stores, as an interrupt status, an interrupt cause code in a fixed area 44a-3 in a table 43a-3. That is, simultaneously with an interrupt, the interrupt handler launched by the fourth processing unit 37a-3 stores, as an interrupt status, an interrupt cause code and an interrupt cause address in the fixed area 44a-3. The interrupt handler determines whether or not an interrupt occurred, on the basis of the interrupt cause code and the interrupt cause address.

After the fourth processing unit 37a-3 launches the interrupt handler in relation to the compare-and-swap instruction, the table 43a-3 stores a model-dependent item (i.e., an item that depends on the model) extracted from the logic specifications of the processor 12a. The table 43a-3 in the third embodiment stores a compare-and-swap write-back. In the third embodiment, the operations stored in the items in the table 43a-3 include two finite options, i.e., a flag indicating 1 when it is on and a flag indicating 0 when it is off.

For simulating the operations of the model-dependent items for the processor 12b to be tested, the simulation unit 34a-3 refers to the table 43a-3 to determine the operation of the simulation unit 34a-3. By referring to the table 43a-3, the simulation unit 34a-3 performs simulation adapted for the processor 12b to be tested. The model-dependent operation of the processor 12a in the third embodiment is a compare-and-swap write-back.

When an interrupt due to a write protection condition occurs after the compare-and-swap instruction is executed, the simulation unit 34a-3 turns on, in a corresponding entry in the table 43a-3 stored in the second storage unit 42a, a flag indicating that write-back is to be performed. When an interrupt due to a write protection condition does not occur after the compare-and-swap instruction is executed, the simulation unit 34a-3 turns off, in the corresponding entry in the table 43a-3 stored in the second storage unit 42a, the flag indicating that write-back is to be performed. During simulation of the compare-and-swap instruction, when the data stored in the first storage unit 41a-3 and the replacement data are the same, the simulation unit 34a-3 refers to the table 43a-3 to determine whether or not write-back to the primary storage device 11a is to be performed and performs instruction simulation.

Figure 16:
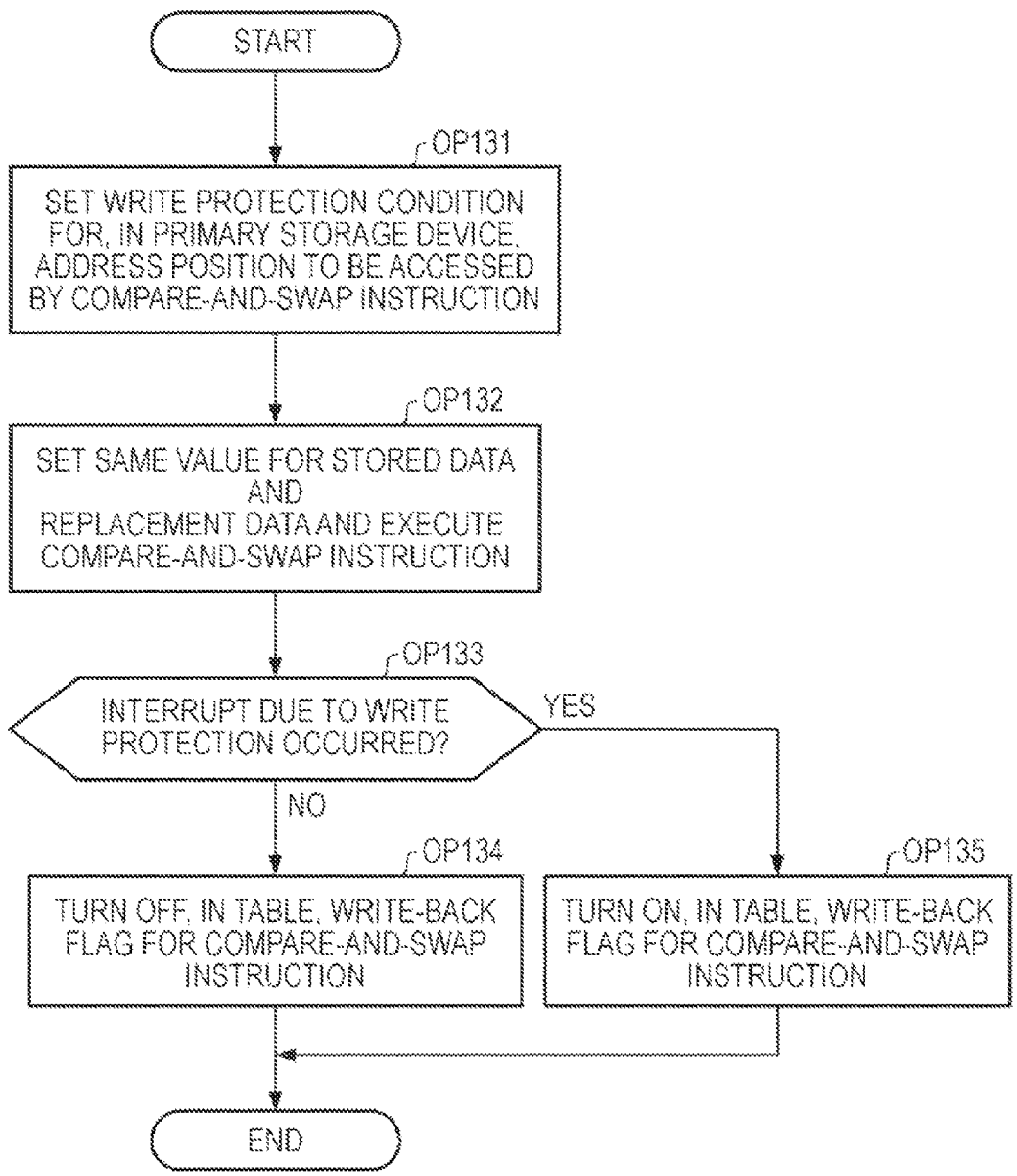
FIG. 16 is a flowchart of the operation of the processor testing apparatus according to the third embodiment.

FIG. 16 is a flowchart illustrating operation pre-checking of the processor testing apparatus 20a according to the third embodiment. In FIG. 16, elements that are substantially the same as those illustrated in FIGS. 1 to 6 in the first embodiment and those illustrated in FIGS. 10, 11, and 15 in the second embodiment are denoted by the same reference numerals, and descriptions thereof are not given hereinafter.

The flowchart illustrated in FIG. 16 has one conditional-branching processing operation in operation OP133. Depending on the conditional-branching operation, the flowchart illustrated in FIG. 16 has the following combinations of processing operations.

Operation Pre-Checking Flow 1: NO in OP133
Operation Pre-Checking Flow 2: YES in OP133

The two flows noted above will be described below with reference to FIG. 16. In the third embodiment, the processor 12a executes the program 30a to allow the first processing unit 31a to the seventh processing unit 40a to perform operations, as in the first and second embodiments. In the following descriptions, a description for processing in which the first processing unit 31a issues processing instructions to the second processing unit 32a to the seventh processing unit 40a is omitted in order to avoid redundancy, as in the first and second embodiments.

In operation OP131 in FIG. 16, the pre-checking unit 36a-3 sets a write protection condition for, in the primary storage device 11a, an address position to be accessed by the compare-and-swap instruction.

In operation OP132, the pre-checking unit 36a-3 sets the same value for the value of data stored at an address position in the primary storage device 11a and the value of replacement data to be replaced by the compare-and-swap instruction and executes the compare-and-swap instruction. In operation OP133, the pre-checking unit 36a-3 determines whether or not an interrupt due to a write protection occurred.

In the case of the operation pre-checking flow 1, since an interrupt due to a write protection does not occur (NO in operation OP133), the process proceeds to operation OP134 in which the fourth processing unit 37a-3 turns off, in the table 43a-3 stored in the second storage unit 42a, a write-back flag for the compare-and-swap instruction. That is, the fourth processing unit 37a-3 sets 0 for, in the table 43a-3 stored in the second storage unit 42a, the write-back flag for the compare-and-swap instruction.

In operation OP132, the pre-checking unit 36a-3 sets the same value for the value of the data stored at the address position in the primary storage device 11a and the value of replacement data to be replaced by the compare-and-swap instruction and executes the compare-and-swap instruction. In operation OP133, the pre-checking unit 36a-3 determines whether or not an interrupt due to a write protection occurred.

In the case of the operation pre-checking flow 2, since an interrupt due to write protection occurs (YES in operation OP133), the process proceeds to operation OP135 in which the fourth processing unit 37a-3 turns on, in the table 43a-3 stored in the second storage unit 42a, the write-back flag for the compare-and-swap instruction. That is, the fourth processing unit 37a-3 sets 1 for, in the table 43a-3 stored in the second storage unit 42a, the write-back flag for the compare-and-swap instruction.

Figure 17:
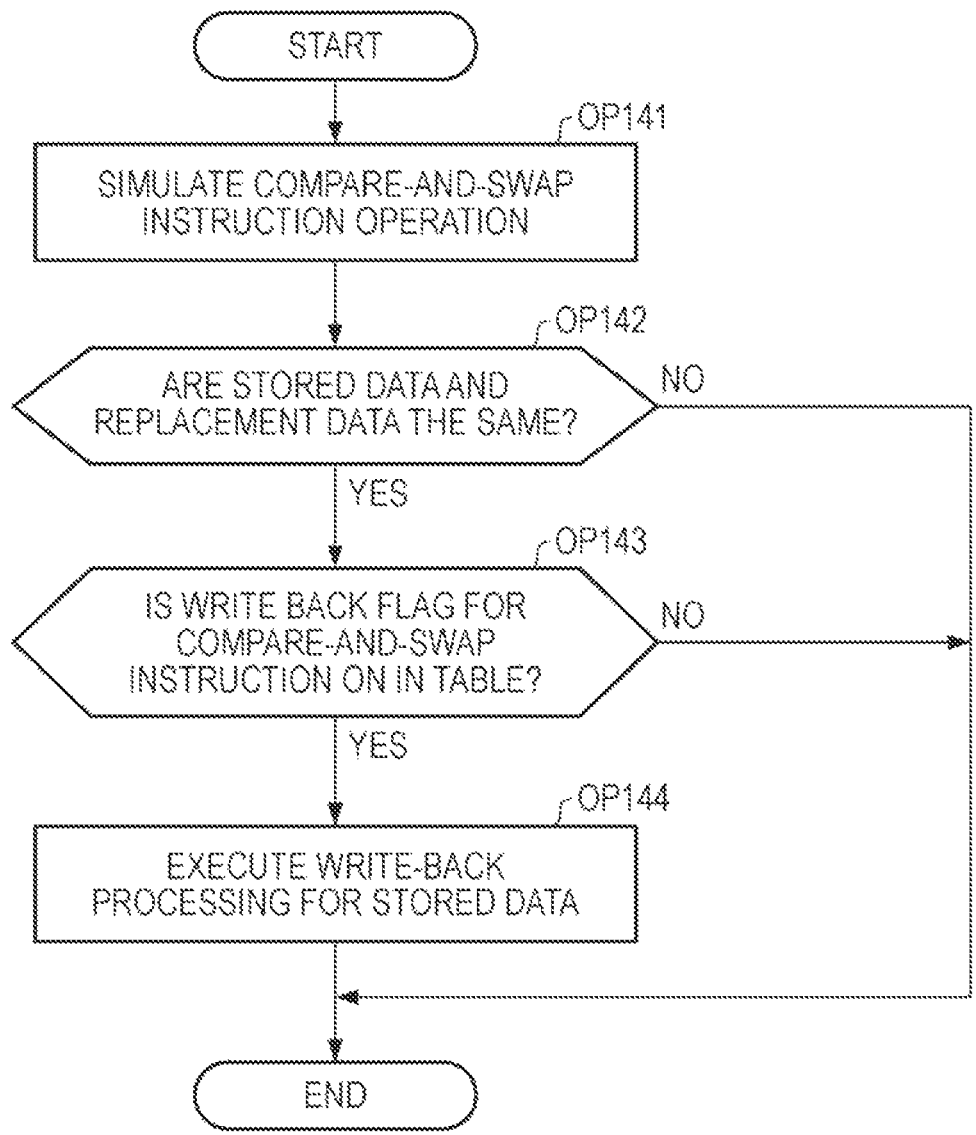
FIG. 17 is a flowchart of the operation of the processor testing apparatus according to the third embodiment.

FIG. 17 is a flowchart illustrating an instruction simulation operation of the processor testing apparatus 20a according to the third embodiment. In FIG. 17, elements that are substantially the same as those illustrated in FIGS. 1 to 6 in the first embodiment and those illustrated in FIGS. 10, 11, 15, and 16 in the second embodiment are denoted by the same reference numerals, and descriptions thereof are not given hereinafter.

The flowchart illustrated in FIG. 17 has two conditional-branching processing operations, i.e., operations OP142 and OP143. Depending on these conditional-branching operations, the flowchart illustrated in FIG. 17 has the following combinations of processing operations.

Instruction Simulation Operation Flow 1: YES in OP142 and YES in OP143
Instruction Simulation Operation Flow 2: NO in OP142
Instruction Simulation Operation Flow 3: YES in OP142 and NO in OP143

The three flows noted above will be described below with reference to FIG. 17. In the following descriptions given with reference to FIG. 17, a description for processing in which the first processing unit 31a issues processing instructions to the second processing unit 32a to the seventh processing unit 40a is omitted in order to avoid redundancy, as in FIG. 16.

In operation OP141, the simulation unit 34a-3 executes simulation for a compare-and-swap instruction operation. In operation OP142, the simulation unit 34a-3 determines whether or not data stored in the primary storage device 11a and replacement data are the same.

In the case of the instruction simulation operation flow 1, the data stored in the primary storage device 11a and the replacement data are the same (YES in operation OP142), the process proceeds to operation OP143 in which the simulation unit 34a-3 determines whether or not the write-back flag for the compare-and-swap instruction is on in the table 43a-3. In the case of the instruction simulation operation flow 1, since the write-back flag for the compare-and-swap instruction is on (YES in operation OP143), the process proceeds to operation OP144 in which the simulation unit 34a-3 executes write-back processing for the stored data.

In operation OP141, the simulation unit 34a-3 executes simulation for a compare-and-swap instruction operation. In operation OP142, the simulation unit 34a-3 determines whether or not the data stored in the primary storage device 11a and the replacement data are the same. In the case of the instruction simulation operation flow 2, since the data stored in the primary storage device 11a and the replacement data are not the same (NO in operation OP142), the simulation unit 34a-3 ends the simulation for the compare-and-swap-instruction operation.

In operation OP141, the simulation unit 34a-3 executes simulation for the compare-and-swap instruction operation. In operation OP142, the simulation unit 34a-3 determines whether or not the data stored in the primary storage device 11a and the replacement data are the same.

In the case of the instruction simulation operation flow 3, the data stored in the primary storage device 11a and the replacement data are the same (YES in operation OP142), the process proceeds to operation OP143 in which the simulation unit 34a-3 determines whether or not the write-back flag for the compare-and-swap instruction is on in the table 43a-3. In the case of the instruction simulation operation flow 3, since the write-back flag for the compare-and-swap instruction is not on (NO in operation OP143), the simulation unit 34a-3 ends the simulation for the compare-and-swap instruction operation.

According to the technology disclosed in the third embodiment, the processor testing apparatus 20a according to the third embodiment may determine an expectation value resulting from the simulation pre-considering the compare-and-swap write-back as a model-dependent operation. Thus, since the expectation value is used to verify the operation of the processor 12b, no complicated process is desirable and the operation of the processor 12b may be verified efficiently. In addition, since the operation verification may be executed independently of the model-dependent operations, the accuracy of the operation verification of the processor 12b may be improved.

A fourth embodiment will be described below with reference to FIGS. 18 to 20.

Figure 18:
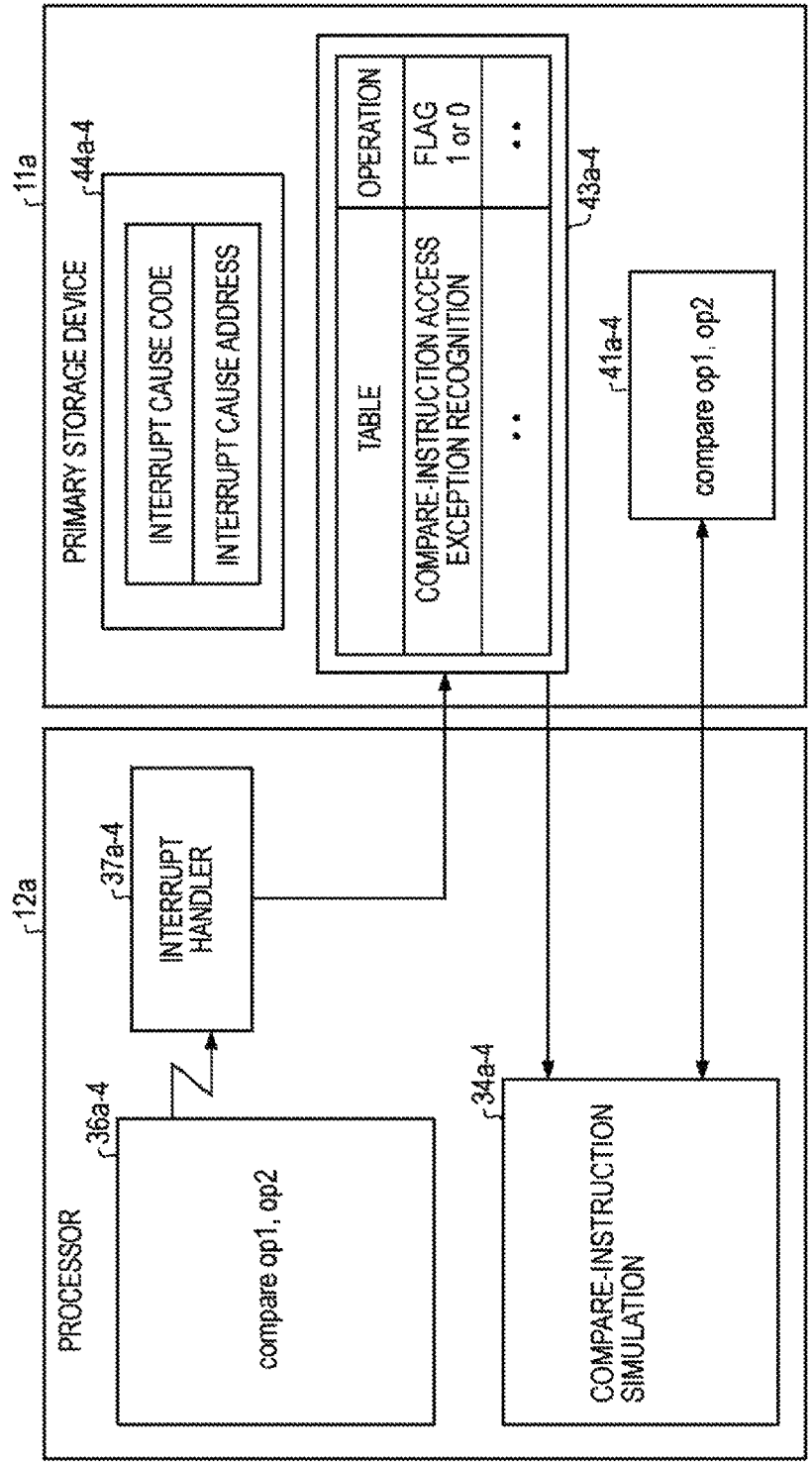
FIG. 18 is a diagram illustrating processing of a processor testing apparatus according to a fourth embodiment.

FIG. 18 is a diagram illustrating processing of a processor testing apparatus 20a according to a fourth embodiment. In the diagram of FIG. 18 illustrating processing of the processor testing apparatus 20a, elements that are substantially the same as those illustrated FIGS. 1 to 6 in the first embodiment, those illustrated in FIG. 9 in the second embodiment, and those illustrated FIG. 15 in the third embodiment are denoted by the same reference characters, and descriptions thereof are not given hereinafter. The model-dependent operation of the processor 12a in the fourth embodiment is a compare-instruction access exception recognition described below.

In FIG. 18, a pre-checking unit 36a-4 executes a compare instruction for comparing an operand op1 stored in the register 12a-2 with an operand op2 stored in the primary storage device 11a serving as a memory. The pre-checking unit 36a-4 sets an invalid page at, in the primary storage device 11a, an address where data subsequent to a byte at which the operands op1 and op2 do not match each other for the first time is stored. The invalid page indicates that data to be accessed is not stored in a first storage unit 41a-4. The invalid page holds invalid data. After setting an invalid page at, in the primary storage device 11a, an address where data subsequent to a byte at which the operands op1 and op2 do not match each other, the pre-checking unit 36a-4 executes a compare instruction for comparing the operand op1 stored in the register 12a-2 with the operand op2 stored in the primary storage device 11a.

At the same time the interrupt handler is launched, the processor 12a stores, as an interrupt status, an interrupt cause code and an interrupt cause address in a fixed area 44a-4 in a table 43a-4. That is, simultaneously with an interrupt, the interrupt handler launched by a fourth processing unit 37a-4 stores, as an interrupt status, an interrupt cause code and an interrupt cause address in the fixed area 44a-4. The interrupt handler determines whether or not an interrupt occurred, on the basis of the interrupt cause code and the interrupt cause address.

After the compare instruction for comparing the operand op1 stored in the register 12a-2 with the operand op2 stored in the primary storage device 11a is executed, the fourth processing unit 37a-4 launches the interrupt handler. After the compare instruction is executed on the data stored in the first storage unit 41a-4, the interrupt handler checks whether or not an interrupt due to an access exception recognition occurred. The first processing unit 31a causes the fourth processing unit 37a-4 to add the launched interrupt handler as an instruction subsequent to the test instruction sequence stored in the first storage unit 41a-4.

After the fourth processing unit 37a-4 launches the interrupt handler in relation to the compare instruction, the table 43a-4 stores a model-dependent item (i.e., an item that depends on the model) extracted from the logic specifications of the processor 12a. The table 43a-4 in the fourth embodiment stores the compare-instruction exception recognition. In the fourth embodiment, the operations stored in the items in the table 43a-4 include two finite options, i.e., a flag indicating 1 when it is on and a flag indicating 0 when it is off.

For simulating the operations of the model-dependent items for the processor 12b to be tested, the simulation unit 34a-4 refers to the table 43a-4 to determine the operation of the simulation unit 34a-4. By referring to the table 43a-4, the simulation unit 34a-4 performs simulation adapted for the processor 12b to be tested. The model-dependent operation of the processor 12a in the fourth embodiment is a compare-instruction access exception recognition.

When an interrupt due to an access exception recognition occurs after the compare instruction is executed, the simulation unit 34a-4 turns on, in the table 43a-4, a flag indicating that an access exception for the compare instruction is recognized. When an interrupt due to an access exception recognition does not occur after the compare instruction is executed, the simulation unit 34a-4 turns off, in the table 43a-4, the flag indicating that an access exception for the compare instruction is recognized. The simulation unit 34a-4 then determines whether or not an access exception is recognized at, in the primary storage device 11a, an address where data subsequent to a byte at which the operands op1 and op2 do not match each other for the first time is stored, and performs instruction simulation.

Figure 19:
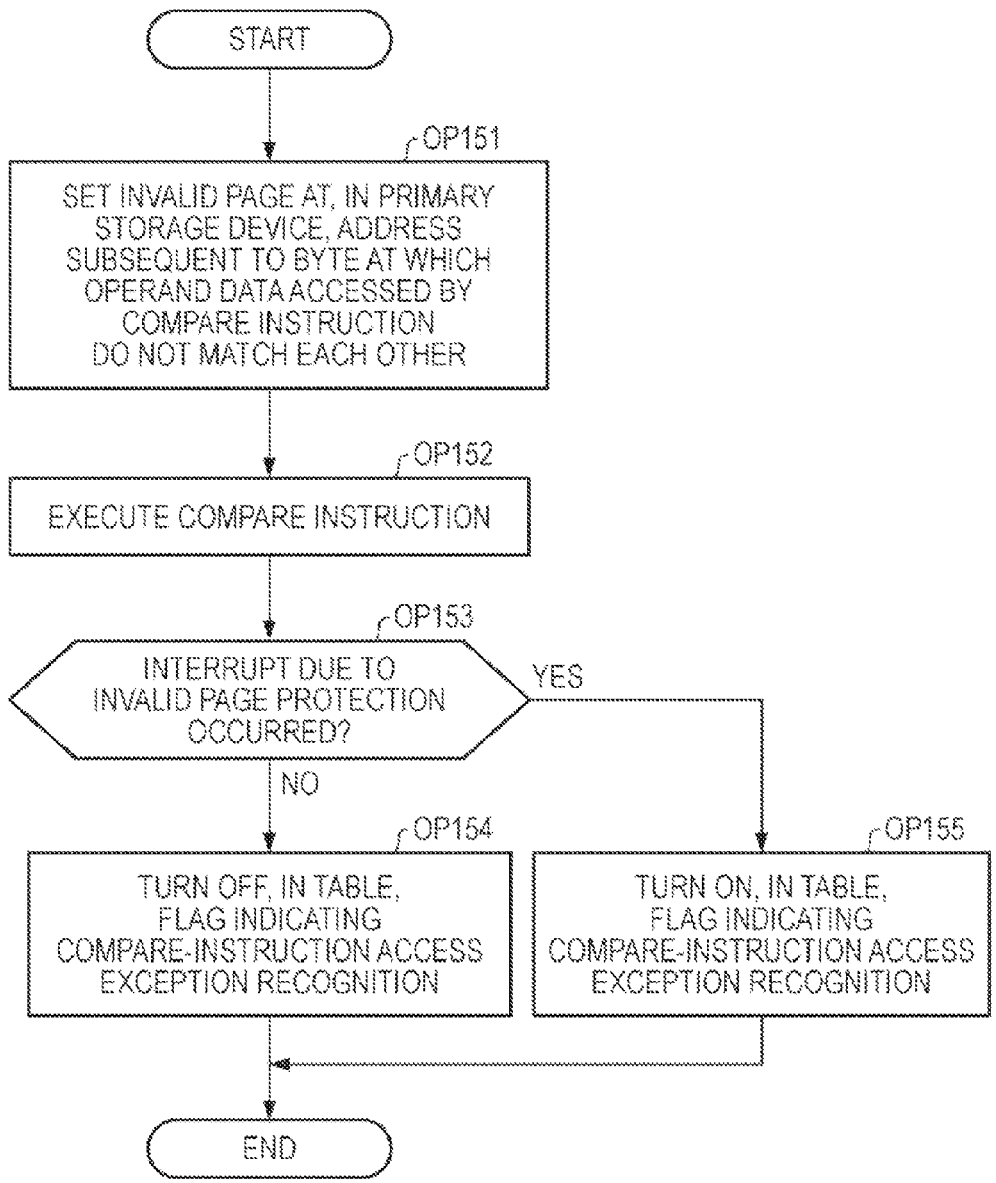
FIG. 19 is a flowchart of the operation of the processor testing apparatus according to the fourth embodiment.

FIG. 19 is a flowchart illustrating operation pre-checking of the processor testing apparatus 20a according to the fourth embodiment. In FIG. 16, elements that are substantially the same as those illustrated in FIGS. 1 to 6 in the first embodiment, those illustrated in FIGS. 10 and 11 in the second embodiment, and those illustrated in FIGS. 15 to 17 in the third embodiment, and those illustrated in FIG. 18 are denoted by the same reference numerals, and descriptions thereof are not given hereinafter.

The flowchart illustrated in FIG. 19 has one conditional-branching processing operation in operation OP153. Depending on the conditional-branching operation, the flowchart illustrated in FIG. 19 has the following combinations of processing operations.

Operation Pre-Checking Flow 1: NO in OP153
Operation Pre-Checking Flow 2: YES in OP153

The two flows noted above will be described below with reference to FIG. 19. In the fourth embodiment, the processor 12a executes the program 30a to allow the first processing unit 31a to the seventh processing unit 40a to perform operations, as in the first, second, and third embodiments. In the following descriptions, a description for processing in which the first processing unit 31a issues processing instructions to the second processing unit 32a to the seventh processing unit 40a is omitted in order to avoid redundancy, as in the first, second, and third embodiments.

In FIG. 19, the pre-checking unit 36a-4 accesses the operands op1 and op2 on which a compare instruction is to be executed, the operand op1 being stored in the register 12a-2 and the operand op2 being stored in the primary storage device 11a serving as a memory. In operation OP151, the pre-checking unit 36a-4 sets an invalid page at, in the primary storage device 11a, a data-storing address subsequent to a byte at which the operands op1 and op2 do not match each other for the first time.

In operation OP152, the pre-checking unit 36a-4 executes a compare instruction for comparing the operand op1 stored in the register 12a-2 with the operand op2 stored in the primary storage device 11a. After the execution of the compare instruction, the process proceeds to operation OP153 in which the pre-checking unit 36a-4 determines whether or not an interrupt due to an invalid page protection occurred.

In the case of the operation pre-checking flow 1, since an interrupt due to an invalid page protection does not occur (NO in operation OP153), the process proceeds to operation OP154 in which the fourth processing unit 37a-4 turns off, in the table 43a-4, a flag indicating a compare-instruction access exception recognition. That is, the fourth processing unit 37a-4 sets 0 for the flag indicating the compare-instruction access exception recognition.

In operation OP152, the pre-checking unit 36a-4 executes a compare instruction for comparing the operand op1 stored in the register 12a-2 with the operand op2 stored in the primary storage device 11a. After the execution of the compare instruction, the process proceeds to operation OP153 in which the pre-checking unit 36a-4 determines whether or not an interrupt due to an invalid page protection occurred.

In the case of the operation pre-checking flow 2, since an interrupt due to an invalid page protection occurs (YES in operation OP153), the process proceeds to operation OP155 in which the fourth processing unit 37a-4 turns on, in the table 43a-4, the flag indicating the compare-instruction access exception recognition. That is, the fourth processing unit 37a-4 sets 1 for the flag indicating the compare-instruction access exception recognition.

Figure 20:
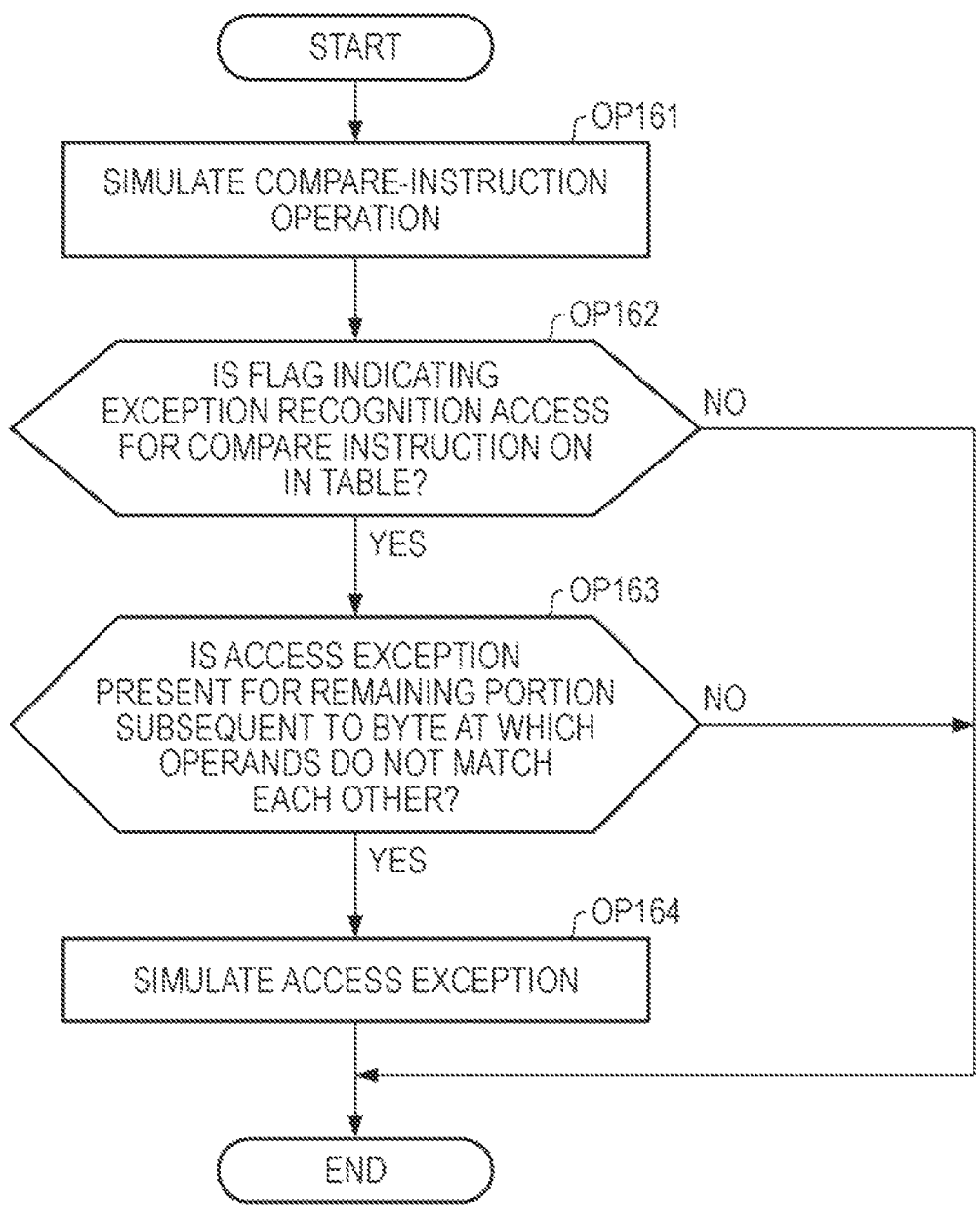
FIG. 20 is a flowchart of the operation of the processor testing apparatus according to the fourth embodiment.

FIG. 20 is a flowchart illustrating an instruction simulation operation of the processor testing apparatus 20a according to the fourth embodiment. In FIG. 20, elements that are substantially the same as those illustrated in FIGS. 1 to 6 in the first embodiment, those illustrated in FIGS. 10 and 11 in the second embodiment, those illustrated in FIGS. 15 to 17 in the third embodiment, and those illustrated in FIGS. 18 and 19 in the fourth embodiment are denoted by the same reference numerals, and descriptions thereof are not given hereinafter.

The flowchart illustrated in FIG. 20 has two conditional-branching processing operations, i.e., operations OP162 and OP163. Depending on these conditional-branching operations, the flowchart illustrated in FIG. 20 has the following combinations of processing operations.

Instruction Simulation Operation Flow 1: YES in OP162 and YES in OP163
Instruction Simulation Operation Flow 2: NO in OP162
Instruction Simulation Operation Flow 3: YES in OP162 and NO in OP163

The three flows noted above will be described below with reference to FIG. 20. In the following descriptions, a description for processing in which the first processing unit 31a issues processing instructions to the second processing unit 32a to the seventh processing unit 40a is omitted in order to avoid redundancy, as in FIG. 19.

In operation OP161, the simulation unit 34a-4 executes simulation for the compare-instruction operation. In operation OP162, the simulation unit 34a-4 determines whether or not the flag indicating the access exception recognition for the compare instruction is on, the flag being contained in the table 43a-4.

In the case of the instruction simulation operation flow 1, since the flag indicating the access exception recognition for the compare instruction is on (YES in operation OP162), the process proceeds to operation OP163 in which the simulation unit 34a-4 determines whether or not an access exception is recognized at, in the primary storage device 11a, an address where data subsequent to a byte at which the operand op1 and the operand op2 do not match each other for the first time is stored. In the case of the instruction simulation operation flow 1, since the access exception is recognized at, in the primary storage device 11a, an address where data subsequent to a byte at which the operands op1 and op2 do not match each other for the first time (YES in operation OP163), the process proceeds to operation OP164 in which the simulation unit 34a-4 simulates the access exception.

In operation OP161, the simulation unit 34a-4 executes simulation for the compare-instruction operation. In operation OP162, the simulation unit 34a-4 determines whether or not the flag indicating the access exception recognition for the compare instruction is on in the table 43a-4. In the case of the instruction simulation operation flow 2, since the flag indicating the access exception recognition for the compare instruction is not on in the table 43a-4 (NO in operation OP162), the simulation unit 34a-4 ends the simulation for the compare-instruction operation.

In operation OP161, the simulation unit 34a-4 executes simulation for the compare-instruction operation. In operation OP162, the simulation unit 34a-4 determines whether or not the flag indicating the access exception recognition for the compare instruction is on in the table 43a-4. In the case of the instruction simulation operation flow 3, since the flag indicating the access exception recognition for the compare instruction is on in the table 43a-4 (YES in operation OP162), the process proceeds to operation OP163 in which the simulation unit 34a-4 determines whether or not an access exception is recognized at, in the primary storage device 11a, an address where data subsequent to a byte at which the operands op1 and op2 do not match each other for the first time. In the case of the instruction simulation operation flow 3, since no access exception is recognized at, in the primary storage device 11a, an address where data subsequent to a byte at which the operands op1 and op2 do not match each other for the first time (NO in operation OP163), the simulation unit 34a-4 ends the simulation for the compare-instruction operation.

According to the technology disclosed in the fourth embodiment, the processor testing apparatus 20a according to the fourth embodiment may determine an expectation value resulting from the simulation pre-considering the compare-instruction access exception recognition as a model-dependent operation. Thus, since the expectation value is used to verify the operation of the processor 12b, no complicated process is desirable and the operation of the processor 12b may be verified efficiently. In addition, since the operation verification may be executed independently of the model-dependent operations, the accuracy of the operation verification of the processor 12b may be improved.

All examples and conditional language recited herein are intended for pedagogical purposes to aid the reader in understanding the embodiment and the concepts contributed by the inventor to furthering the art, and are to be construed as being without limitation to such specifically recited examples and conditions, nor does the organization of such examples in the specification relate to a illustrating of the superiority and inferiority of the embodiment. Although the embodiments of the present inventions have been described in detail, it should be understood that the various changes, substitutions, and alterations could be made hereto without departing from the spirit and scope of the invention.

What is claimed is:

1. A method of verifying an operation of a processor, the method comprising:
    specifying a model dependent item on which different test instruction sequences occur in processors of different models with the same logic specifications;
    generating a random number by using a random number generation algorithm;
    generating a test instruction based on both the model dependent item and the random number;
    executing, by a software simulator, the test instruction;
    obtaining an expectation value from a result of the executed test instruction;
    obtaining a result value of the test instruction executed by the processor; and
    comparing, by a verification processor, the obtained expectation value with the obtained result value to determine a match or mismatch between the expectation value and the result value.

2. The method according to claim 1, wherein,
    the test instruction includes an instruction that sets an access order for a first operand and a second operand when the processor executes a move instruction including the first operand and the second operand.

3. The method according to claim 2, wherein the executing of the test instruction includes,
    determining whether or not an exception condition is present for the first operand;
    determining whether or not the first operand is the first operand in the operand access order; and
    when the exception condition is present and the first operand is the first operand, simulating an access exception for the first operand.

4. The method according to claim 1, wherein,
    the test instruction includes an instruction that sets an order of occurrence of exceptions when the processor executes a division instruction in which a data format of operands is specified.

5. The method according to claim 4, wherein
    the plurality of exceptions include at least one of a data exception that occurs when a data format of an operand serving as a divisor is different from the specified data format, a division exception that occurs when the divisor is 0, and an access exception that occurs when storage access to a memory in which an operand serving as a divisor is stored is not permitted.

6. The method according to claim 1, wherein,
    the test instruction includes an instruction that sets whether or not to permit a processor to write back data stored in a memory by the other processor when the other processor executes exclusive control with the processor.

7. The method according to claim 1, wherein
    the processor executes a comparison instruction for comparing, for each byte, first bytes contained in first data stored in a cache memory connected to the processor and is to be executed by the processor with second bytes contained in second data stored in a memory connected to the processor, and
    when the first bytes and the second bytes have a different byte, the test instruction sequence includes an instruction sequence that recognizes whether or not an access exception that occurs when storage access to the memory is not permitted is set for the remaining first bytes and second bytes on which the comparison instruction has not been executed.

8. An apparatus for verifying an operation of a first processor, the apparatus comprising:
a memory; and
a second processor coupled to the memory and configured to:
specify a model dependent item on which different test instruction sequences occur in processors of different models with the same logic specifications;
generate a random number by using a random number generation algorithm;
generate a test instruction based on both the model dependent item and the random number;
execute, with a software simulator, the test instruction to obtain an expectation value from a result of the executed test instruction;
obtain a result value of the test instruction which is executed by the first processor; and
compare the expectation value with the result value.

9. The apparatus according to claim 8, wherein,
the test instruction includes an instruction that sets an access order for a first operand and a second operand when the first processor executes a move instruction including the first operand and the second operand.

10. The apparatus according to claim 8, wherein,
the test instruction includes an instruction that sets an order of occurrence of exceptions when the processor executes a division instruction in which a data format of operands is specified.

11. The apparatus according to claim 10, wherein
the plurality of exceptions include at least one of a data exception that occurs when a data format of an operand serving as a divisor is different from the specified data format, a division exception that occurs when the divisor is 0, and an access exception that occurs when storage access to a memory in which an operand serving as a divisor is stored is not permitted.

12. The apparatus according to claim 8, wherein,
the test instruction includes an instruction that sets whether or not to permit a processor to write back data stored in a memory by the other processor when the other processor executes exclusive control with the processor.

13. The apparatus according to claim 8, wherein
the processor executes a comparison instruction for comparing, for each byte, first bytes contained in first data stored in a cache memory connected to the processor and is to be executed by the processor with second bytes contained in second data stored in a memory connected to the processor, and
when the first bytes and the second bytes have a different byte, the test instruction sequence includes an instruction sequence that recognizes whether or not an access exception that occurs when storage access to the memory is not permitted is set for the remaining first bytes and second bytes on which the comparison instruction has not been executed.

14. A computer-readable, non-transitory medium storing a program that causes a second processor to execute a procedure for controlling an apparatus for verifying an operation of a first processor, the procedure comprising:
specifying a model dependent item on which different test instruction sequences occur in processors of different models with the same logic specifications;
generating a random number by using a random number generation algorithm;
generating a test instruction based on both the model dependent item and the random number;
executing, using a software simulator, the test instruction to an expectation value from a result of the executed test instruction;
obtaining a result value of the test instruction which is executed by the first processor; and
comparing the expectation value with the result value.

15. The computer-readable, non-transitory medium according to claim 14, wherein, the test instruction includes an instruction that sets an access order for a first operand and a second operand when the first processor executes a move instruction including the first operand and the second operand.

16. The computer-readable, non-transitory medium according to claim 14, wherein,
the test instruction includes an instruction that sets an order of occurrence of exceptions when the processor executes a division instruction in which a data format of operands is specified.

17. The computer-readable, non-transitory medium according to claim 16, wherein
the plurality of exceptions include at least one of a data exception that occurs when a data format of an operand serving as a divisor is different from the specified data format, a division exception that occurs when the divisor is 0, and an access exception that occurs when storage access to a memory in which an operand serving as a divisor is stored is not permitted.

18. The computer-readable, non-transitory medium according to claim 14, wherein,
the test instruction includes an instruction that sets whether or not to permit a processor to write back data stored in a memory by the other processor when the other processor executes exclusive control with the processor.

19. The computer-readable, non-transitory medium according to claim 14, wherein
the processor executes a comparison instruction for comparing, for each byte, first bytes contained in first data stored in a cache memory connected to the processor and is to be executed by the processor with second bytes contained in second data stored in a memory connected to the processor, and
when the first bytes and the second bytes have a different byte, the test instruction sequence includes an instruction sequence that recognizes whether or not an access exception that occurs when storage access to the memory is not permitted is set for the remaining first bytes and second bytes on which the comparison instruction has not been executed.

* * * * *